US008741020B2

(12) United States Patent
Kishimoto et al.

(10) Patent No.: US 8,741,020 B2
(45) Date of Patent: Jun. 3, 2014

(54) EXHAUST GAS PURIFICATION FILTER, AND METHOD OF MANUFACTURING EXHAUST GAS PURIFICATION FILTER

(75) Inventors: Atsushi Kishimoto, Tokyo (JP); Masamichi Tanaka, Tokyo (JP); Keita Ishizaki, Utsunomiya (JP); Katsunori Hanamura, Tokyo (JP)

(73) Assignees: Sumitomo Osaka Cement Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/640,341

(22) PCT Filed: Apr. 7, 2011

(86) PCT No.: PCT/JP2011/058777
§ 371 (c)(1),
(2), (4) Date: Oct. 10, 2012

(87) PCT Pub. No.: WO2011/129253
PCT Pub. Date: Oct. 20, 2011

(65) Prior Publication Data
US 2013/0025247 A1    Jan. 31, 2013

(30) Foreign Application Priority Data
Apr. 12, 2010   (JP) ................ 2010-091628

(51) Int. Cl.
*B01D 39/20* (2006.01)
*B01D 39/06* (2006.01)
*B01D 39/14* (2006.01)
*B01D 24/00* (2006.01)
*B01D 50/00* (2006.01)

(52) U.S. Cl.
USPC ............. 55/523; 55/522; 55/524; 422/169; 422/170; 422/171; 422/172; 422/177; 422/178; 422/179; 422/180; 422/181; 422/182

(58) Field of Classification Search
USPC ............. 55/522–524; 422/169–172, 177–182
See application file for complete search history.

(56) References Cited

U.S. PATENT DOCUMENTS

| | | | |
|---|---|---|---|
| 6,761,755 B2 * | 7/2004 | Jantsch et al. | 96/11 |
| 6,939,825 B1 * | 9/2005 | Ohno et al. | 502/439 |
| 2004/0033175 A1 * | 2/2004 | Ohno et al. | 422/180 |
| 2006/0236668 A1 * | 10/2006 | Stobbe et al. | 55/523 |
| 2009/0241496 A1 * | 10/2009 | Pintault et al. | 55/524 |
| 2009/0246453 A1 * | 10/2009 | Yamaguchi | 428/116 |
| 2010/0135866 A1 * | 6/2010 | Mizuno et al. | 422/180 |

FOREIGN PATENT DOCUMENTS

| | | |
|---|---|---|
| EP | 2275185 A1 | 1/2011 |
| JP | 05-023512 A | 2/1993 |

(Continued)

OTHER PUBLICATIONS

International Search Report dated Jul. 12, 2011 corresponding to International Patent Application No. PCT/JP2011/058777 and English Translation thereof.

*Primary Examiner* — Amber Orlando
(74) *Attorney, Agent, or Firm* — Squire Sanders (US) LLP

(57) ABSTRACT

An object is to provide an exhaust gas purification filter that can achieve high trapping efficiency of particulate matter and low pressure loss, and the exhaust gas purification filter includes an inflow surface through which exhaust gas containing particulate matter flows in, a discharge surface from which purified gas is discharged, and a filter base body that is formed from a porous body, wherein the filter base body includes porous partition walls and gas flow paths surrounded by the partition walls, a porous film having a pore size smaller than that of pores of the partition walls is provided on each surface of the partition walls, and microgrooves having a depth shallower than the thickness of the porous film are formed on at least a part of a surface of the porous film.

10 Claims, 7 Drawing Sheets

(56) References Cited

FOREIGN PATENT DOCUMENTS

| | | |
|---|---|---|
| JP | 05-023512 A | 3/1993 |
| JP | 09-077573 A | 3/1997 |
| JP | 2997542 B2 | 10/1999 |
| JP | 2002-295228 A | 10/2002 |
| JP | 2005-296935 A | 10/2005 |
| JP | 2006-239544 A | 9/2006 |
| JP | 2009-255055 A | 11/2009 |
| WO | WO 2008/044497 A1 | 4/2008 |
| WO | WO 2009/133857 A1 | 11/2009 |

* cited by examiner

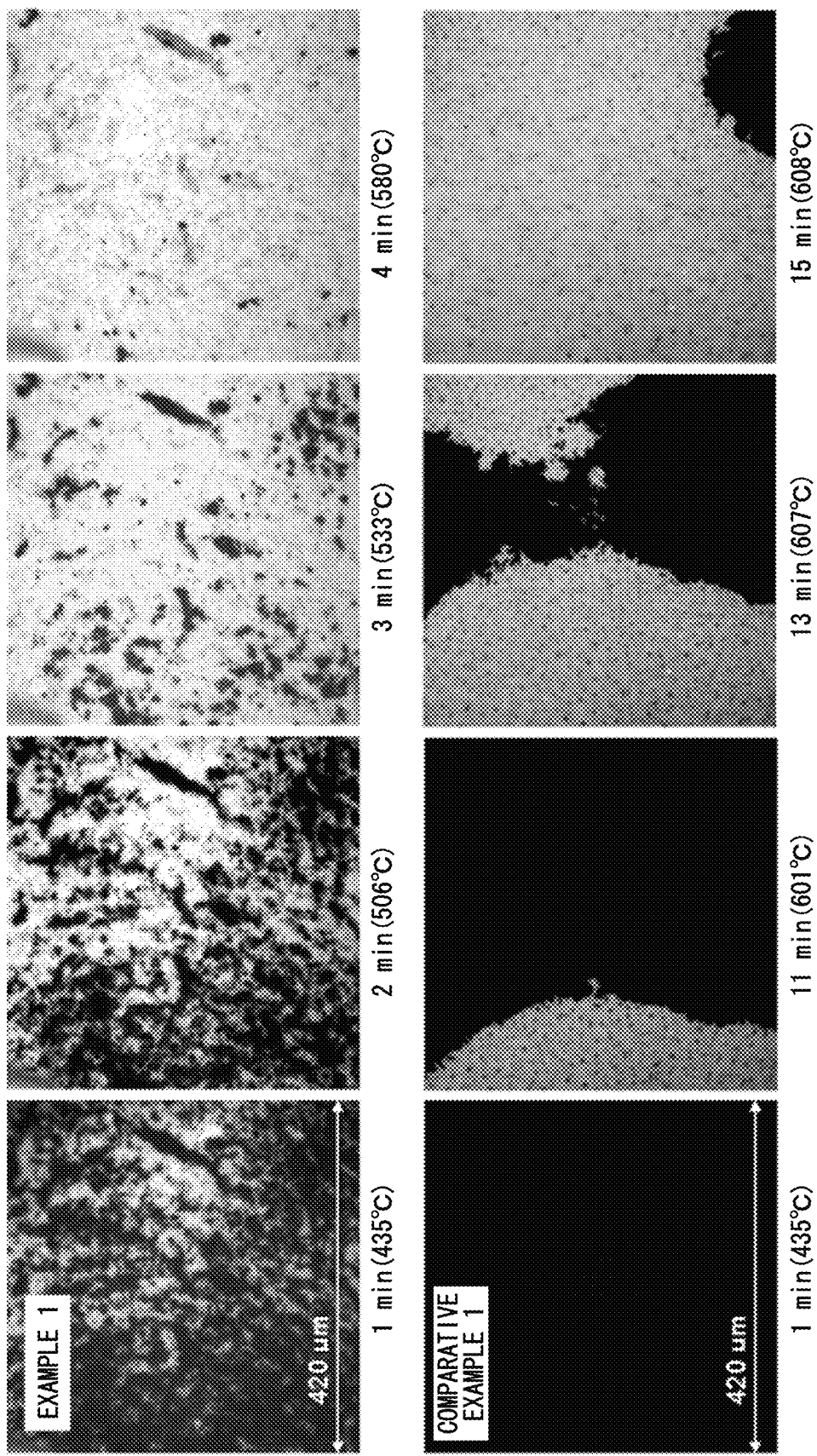

EXHAUST GAS PURIFICATION FILTER, AND METHOD OF MANUFACTURING EXHAUST GAS PURIFICATION FILTER

TECHNICAL FIELD

The present invention relates to an exhaust gas purification filter that removes particulate matter from exhaust gas that is discharged from a diesel engine of a vehicle, or the like, and a method of manufacturing an exhaust gas purification filter.

BACKGROUND ART

Various materials that are contained in the exhaust gas discharged from engines, particularly diesel engines, have become a cause of atmospheric pollution, and have caused various environmental problems. Particularly, particulate matter (PM), which is contained in exhaust gas, is said to be a factor that causes allergic symptoms such as asthma and hay fever.

In general, in a diesel engine for a vehicle, as an exhaust gas purification filter that traps particulate matter, a DPF (Diesel Particulate Filter) provided with a sealed type ceramic honeycomb structure (filter base body) has been used. In this honeycomb structure, both ends of cells (gas flow paths) of the ceramic honeycomb structure are sealed in a checkerboard pattern, and when exhaust gas passes through pores inside partition walls between these cells, the particulate matter is trapped (for example, see PTL 1 and PTL 2).

However, in such a DPF, since a pore size of the pores inside the partition walls is larger than a particle size of PM, particularly, in the early stages of use or in a state immediately after a regeneration treatment (clogging dissolution treatment of a filter through PM removal), there is a problem in that a the PM trapping rate is not sufficient. That is, in regard to DPF, since the trapping rate is improved after a PM layer has formed on a surface of each of the partition walls due to a certain amount of PM being trapped, there is a problem in that the trapping rate is low in the early stages of use or immediately after regeneration. In order to solve this problem, a structure provided with a micro-pore structure is disclosed, which has air permeability, traps PM, and in which aggregates of fine particles having fine gaps are connectedly provided in a surface of the partition wall or in the partition wall (PTL 3).

In addition, for the purpose of efficiently using a catalyst component in the DPF, a structure is disclosed in which a coat layer, which is formed from oxide particles such as alumina, is formed on a surface of a porous inorganic base material such as cordierite (PTL 4). The oxide particles have pores including inter-particulate gaps of 10 to 200 nm, and pore communication holes through which the pores communicate with each other and which include inter-particulate gaps of 10 nm or less. The catalyst component is supported in the pores of the coat layer (PTL 4).

CITATION LIST

Patent Literature

[PTL 1] Japanese Unexamined Patent Application Publication No. 05-23512
[PTL 2] Japanese Unexamined Patent Application Publication No. 09-77573
[PTL 3] Japanese Unexamined Patent Application Publication No. 2005-296935
[PTL 4] Japanese Unexamined Patent Application Publication No. 2006-239544

SUMMARY OF INVENTION

Technical Problem

However, as disclosed in PTL 3 and PTL 4, in a case where the coat layer (porous film) having the micropores in the surface or holes of the porous base material is formed, the PM trapping rate is reliably increased at the early stage of use or immediately after the regeneration, but there is a problem in that pressure loss increases due to a decrease in air permeability caused by the porous film having the micropores.

To suppress the increase in pressure loss, it is preferable to increase the porosity of the porous film having the micropores and to reduce the film thickness. However, in a case where the porosity is made to increase and the film thickness is reduced, there is a problem in that a decrease in the strength of the porous film is caused and thus the porous film having the micropores may be easily broken. Particularly, in the DPF, a temperature during use is high and the DPF is cooled to an ambient air temperature when not in use. Therefore, in a case where the regeneration treatment is performed to remove the trapped PM by combusting, the DPF is susceptible to thermal hysteresis of a repetitive high-temperature, and thus the porous film may be easily broken.

In addition, in the case of making the film thickness small, it is difficult to obtain a uniform porous film, and thus a film body is formed only on the partition walls or on the surface of the porous base material. Therefore, there is a problem in that since the film body is not formed in the pores inside the partition walls or on the pores of the porous base material, in which the porous film is originally necessary, or even when the film body is formed, an opening portion occurs in the porous film.

As described above, in order to accomplish an object of DPF, that is, the trapping of particulate matter, and an improvement in a particulate matter trapping rate or suppression of pressure loss, various kinds of research have been performed with respect to a structure in which the coat layer (porous film) has micropores on the surface of the porous base material or in a hole. However, in the regeneration treatment for removing trapped particulate material from the DPF, specifically, in regard to a treatment in which a temperature of the exhaust gas is increased by introducing a fuel into the exhaust gas and by combusting this fuel, and the like, and the particulate matter trapped in the DPF is removed in a combustion removal process, research on shortening of a treatment time or lowering of a treatment temperature has not been made.

As described above, even in the DPF having a structure in which the film body having micropores is formed, it is difficult to obtain satisfactory characteristics in which high trapping efficiency of the PM and low pressure loss can be achieved, and improvement of the regeneration conditions can be carried out.

The invention was made to solve the above-described problems and an object thereof is to provide an exhaust gas purification filter that can achieve both high trapping efficiency of PM and low pressure loss. In addition, another object of the invention is to provide a method of manufacturing an exhaust gas purification filter in an easy manner.

Solution to Problem

The present inventors have extensively studied to solve the above-described problems. As a result, the present inventors have found that when a porous film having micropores is provided on a surface of partition walls formed from a porous base material, and microgrooves having a depth shallower than the film thickness of the porous film are formed on at least a part of the surface of the porous film, an exhaust gas purification filter, which may achieve both high trapping efficiency of particulate matter and low pressure loss, can be obtained. In addition, the present inventors have found that in a case where a silicon carbide is selected as a material of the porous film, a decrease in treatment time and a decrease in treatment temperature during regeneration of the exhaust gas purification filter can be achieved due to the presence of the microgrooves. As a result, they have accomplished the invention.

According to an aspect of the invention, an exhaust gas purification filter is provided, including an inflow surface through which exhaust gas containing particulate matter flows in, a discharge surface from which purified gas is discharged, and a filter base body that is formed from a porous body. The filter base body includes porous partition walls and gas flow paths surrounded by the partition walls, a porous film having a pore size smaller than a size of pores of the partition walls is provided on each surface of the partition walls, and microgrooves having a depth shallower than the thickness of the porous film are formed on at least a part of a surface of the porous film.

When a projection area of the porous film in a film surface direction is set as F, and a projection area of the microgrooves in the same direction is set as G, it is preferable that a presence ratio of the microgrooves in the surface of the porous film satisfy the equation $0.05 \leq G/F \leq 1$.

In each of the microgrooves, it is preferable that the width be 1 μm or more, and the depth be 0.5 μm to 15 μm.

It is preferable that the thickness of the porous film be 5 to 80 μm.

It is preferable that the pore size of the porous film be smaller than a pore size of the filter base body, and a pore size of the porous film on a surface side be smaller than a pore size of the porous film on a filter base body side.

It is preferable that a material of the porous film include a silicon carbide as a main component.

According to another aspect of the invention, a method of manufacturing an exhaust gas purification filter of the invention is provided. The method includes a step of preparing a coating material containing at least a particle component for forming a porous film and a dispersion medium, a step of applying the coating material on a surface of a filter base body to form an applied film, a step of removing a part of the dispersion medium in the applied film to form a coated film in which fluidity is lost, and a step of further removing the dispersion medium in the coated film in which fluidity is lost to form microgrooves in a surface of the coated film.

According to still another aspect of the invention, a method of manufacturing an exhaust gas purification filter of the invention is provided. The method includes a step of preparing a coating material containing at least a particle component for forming a porous film, a dispersion medium, and a binder component, a step of applying the coating material on a surface of a filter base body to form an applied film containing the binder component, a step of removing the dispersion medium in the applied film containing the binder component to form a cured coated film, and a step of removing the binder component in the cured coated film to form microgrooves in a surface of the coated film.

In addition, in the invention, the term "applied film" represents a film of a coating material that can be obtained by application of the coating material, and the term "coated film" represents a film that is obtained by removing part or the entirety of the dispersion medium from the applied film and by drying the applied film in which fluidity is lost.

It is preferable that the particle component include a first particle containing particles having a primary particle size of 10 to 120 nm in 90% by volume or more, and a second particle containing particles having a primary particle size of 300 to 1,000 nm in 90% by volume or more, and a volume ratio between the first particle and the second particle (the volume of the first particle: the volume of the second particle) be within a range of 3:97 to 97:3.

Advantageous Effects of Invention

According to the exhaust gas purification filter of the invention, the exhaust gas purification filter includes an inflow surface through which exhaust gas containing particulate matter flows in, a discharge surface from which purified gas is discharged, and a filter base body that is formed from a porous body, wherein the filter base body includes porous partition walls and gas flow paths surrounded by the partition walls, a porous film having a pore size smaller than that of pores of the partition walls is provided on each surface of the partition walls, and microgrooves having a depth shallower than the film thickness of the porous film are formed on at least a part of a surface of the porous film. Therefore, due to an effect of providing the microgrooves, both high trapping efficiency of PM and low pressure loss can be achieved. As a result, it is possible to obtain an exhaust gas purification filter having superior characteristics without discharging the PM, which becomes a cause of atmospheric pollution, to ambient air and without applying a load to an engine due to low pressure loss and thus not deteriorating fuel efficiency.

In addition, according to the method of manufacturing an exhaust gas purification filter of the invention, the method is a method of manufacturing an exhaust gas purification filter including an inflow surface through which exhaust gas containing particulate matter flows in, a discharge surface from which purified gas is discharged, and a filter base body that is formed from a porous body, wherein the filter base body includes porous partition walls and gas flow paths surrounded by the partition walls, a porous film having a pore size smaller than that of pores of the partition walls is provided on each surface of the partition walls, and microgrooves having a depth shallower than the film thickness of the porous film are formed on at least a part of a surface of the porous film. The method includes a step of preparing a coating material containing at least a particle component for forming a porous film and a dispersion medium, a step of applying the coating material on a surface of a filter base body to form an applied film, a step of removing a part of the dispersion medium in the applied film to form a coated film in which fluidity is lost, and a step of further removing the dispersion medium in the coated film in which fluidity is lost to form microgrooves in a surface of the coated film. Therefore, the exhaust gas purification filter of the invention can be easily manufactured. As a result, it is possible to easily manufacture an exhaust gas purification filter having superior characteristics without discharging the PM, which becomes a cause of atmospheric pollution, to ambient air and without applying a load to an engine due to low pressure loss and thus not deteriorating fuel efficiency.

In addition, according to the method of manufacturing an exhaust gas purification filter of the invention, the method is a method of manufacturing an exhaust gas purification filter including an inflow surface through which exhaust gas containing particulate matter flows in, a discharge surface from which purified gas is discharged, and a filter base body that is formed from a porous body, wherein the filter base body includes porous partition walls and gas flow paths surrounded by the partition walls, a porous film having a pore size smaller than that of pores of the partition walls is provided on each surface of the partition walls, and microgrooves having a depth shallower than the film thickness of the porous film are formed on at least a part of a surface of the porous film. The method includes a step of preparing a coating material containing at least a particle component for forming a porous film, a dispersion medium, and a binder component, a step of applying the coating material on a surface of a filter base body to form an applied film containing the binder component, a step of removing the dispersion medium in the applied film containing the binder component to form a cured coated film, and a step of removing the binder component in the cured coated film to form microgrooves in a surface of the coated film. Therefore, the exhaust gas purification filter of the invention can be easily manufactured. As a result, it is possible to easily manufacture an exhaust gas purification filter having superior characteristics without discharging the particulate matter, which becomes a cause of atmospheric pollution, to ambient air and without applying a load to an engine due to low pressure loss and thus not deteriorating fuel efficiency.

BRIEF DESCRIPTION OF DRAWINGS

FIG. 8 is a microscope photograph illustrating a result of the example.

DESCRIPTION OF EMBODIMENTS

[Exhaust Gas Purification Filter]

An embodiment of an exhaust gas purification filter of the invention will be described. Here, a description will be made with respect to a DPF as an exhaust gas purification filter that is used in a diesel engine for a vehicle as an example.

In addition, the description will be made specifically for easy comprehension of the invention, but when not particularly specified, the invention is not limited to the description.

The exhaust gas purification filter of the invention is an exhaust gas purification filter including an inflow surface through which exhaust gas containing particulate matter flows in, a discharge surface from which purified gas is discharged, and a filter base body that is formed from a porous body. The filter base body includes porous partition walls and gas flow paths surrounded by the partition walls, in which a porous film having a pore size smaller than that of pores of the partition walls is provided on each surface of the partition walls, and microgrooves having a depth shallower than the film thickness of the porous film are formed on at least a part of a surface of the porous film.

Figure 1:
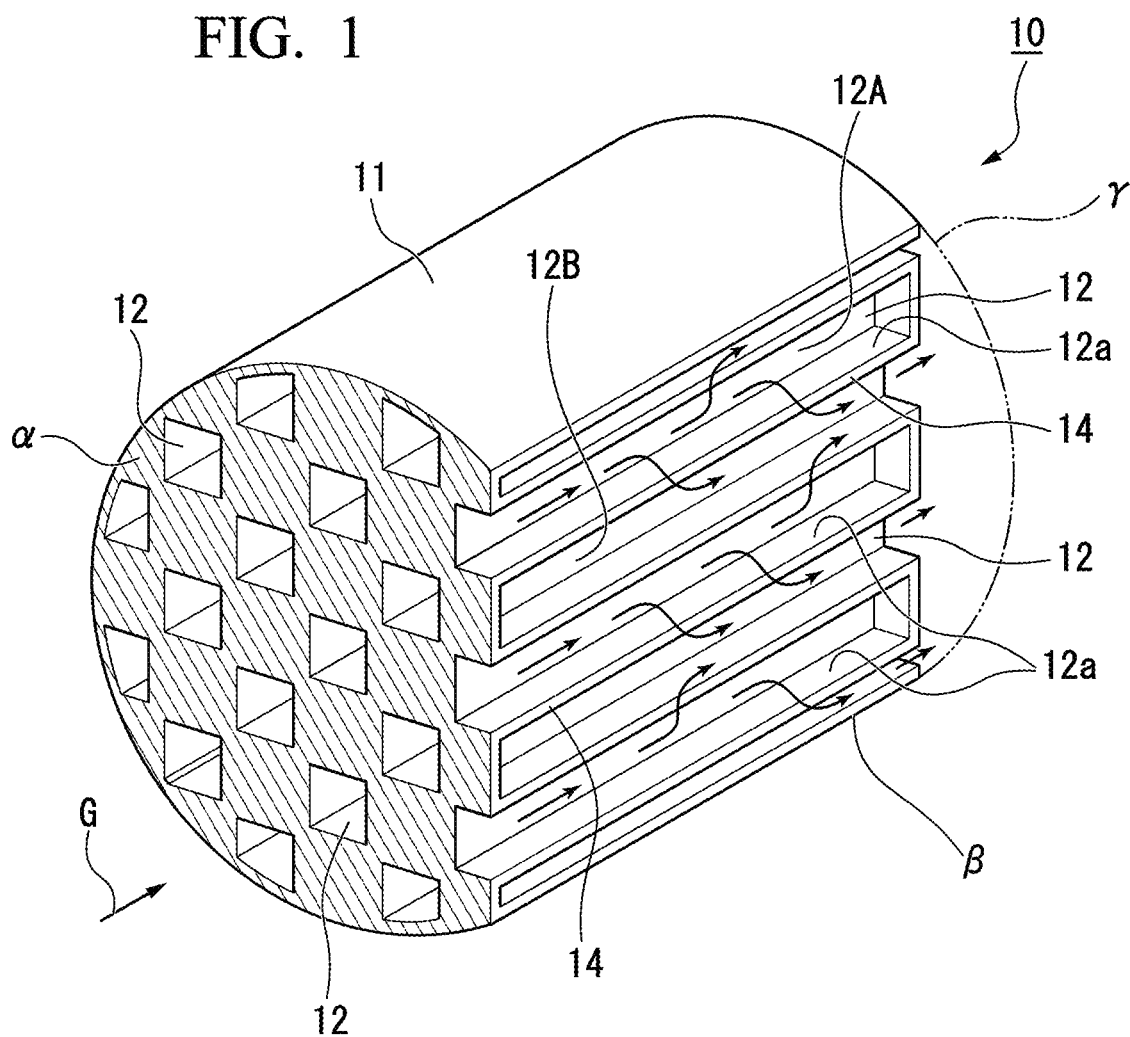
FIG. 1 is a partially broken perspective view illustrating an exhaust gas purification filter according to an embodiment of the invention.
Figure 2:
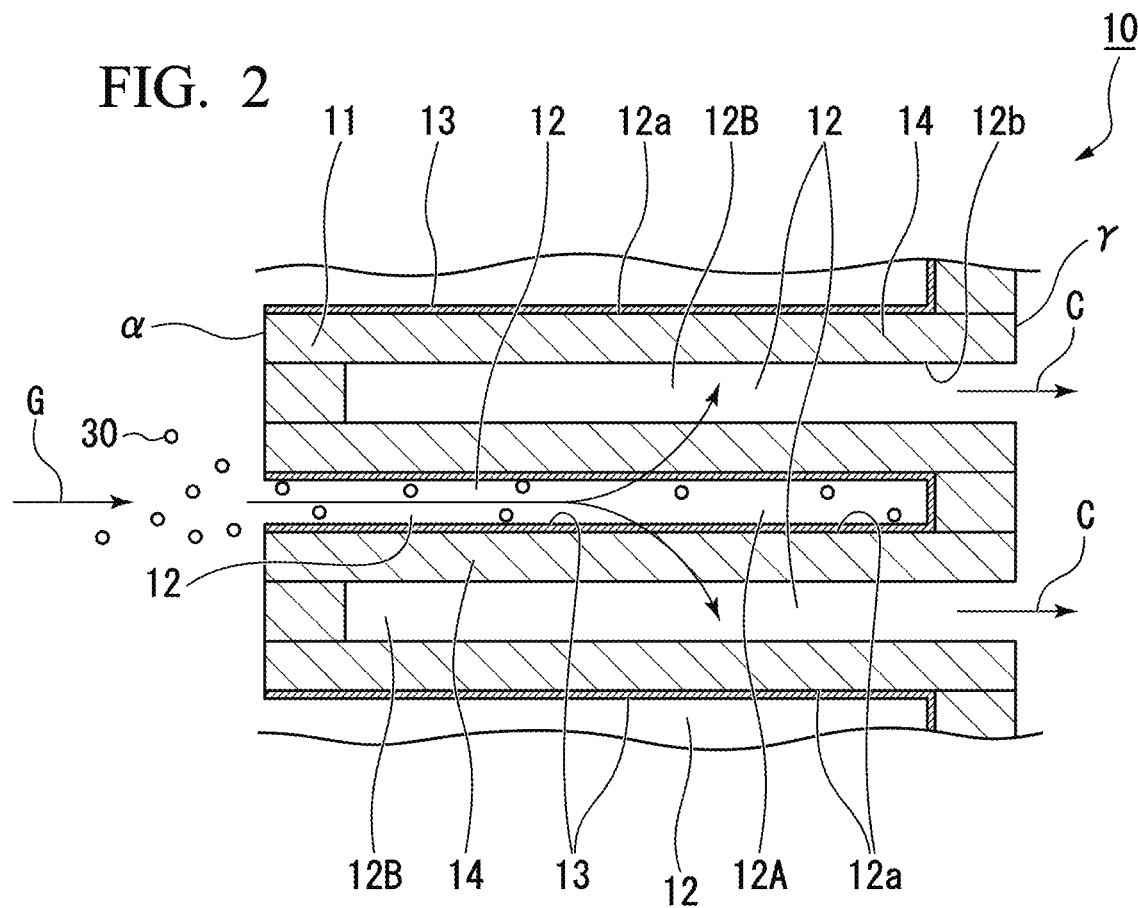
FIG. 2 is a cross-sectional view illustrating a partition wall structure relating to the exhaust gas purification filter according to the embodiment of the invention.

FIG. 1 shows a partially broken perspective view illustrating a DPF as an embodiment of the exhaust gas purification filter of the invention. FIG. 2 shows a cross-sectional view illustrating a partition wall structure of the DPF on a surface indicated by a symbol β in FIG. 1.

As shown in FIG. 1, a DPF 10 includes a filter base body 11 that is formed from cylindrical porous ceramics having a plurality of pores, gas flow paths 12 that are formed inside the filter base body, and a porous film 13 that is provided on an inner wall surface 12a of an inflow cell 12A whose exhaust upstream side end is opened among the gas flow paths 12.

Among both end surfaces of the filter base body 11 in an axial direction thereof, exhaust gas G containing particulate matter flows in from an end surface a side, and purified gas C, which is obtained by removing the particulate matter from the exhaust gas G, is discharged from the other end surface γ side.

The filter base body 11 is a honeycomb structure formed from heat-resistant porous ceramics such as silicon carbide, cordierite, aluminum titanate, and silicon nitride. In the filter base body 11, partition walls 14, which extend along the axial direction that is a flow direction of the exhaust gas G, are formed, and hollow regions, which are surrounded by the partition walls 14, in the axial direction serve as a plurality of cell-shaped gas flow paths 12.

Here, the "honeycomb structure" in this embodiment uses a structure in which the plurality of gas flow paths 12 are formed in parallel with each other in the filter base body 11. A cross-sectional shape of each of the gas flow paths 12 in a direction orthogonal to the axial direction of the gas flow paths 12 is a rectangular shape, but it is not limited thereto, and various cross-sectional shapes such as a polygon, a circle, and an ellipse can be adopted as the cross-sectional shape. In addition, the gas flow paths 12, which are formed in the vicinity of an outer circumference of the filter base body 11, partially have an arc-like cross-sectional shape, but this is because the gas flow paths 12 are formed with a cross-sectional shape conforming to an external shape of the filter base body 11 so as to dispose the gas flow paths 12 up to the vicinity of the outer circumference of the filter base body 11 without a gap.

An average pore size of the partition walls 14 formed from the porous ceramics is preferably 5 to 50 μm. When the average pore size is less than 5 μm, pressure loss due to the partition walls 14 themselves increases, and thus this is not preferable. Conversely, when the average pore size is larger than 50 μm, the strength of the partition walls 14 becomes insufficient and it is difficult to form the porous film 13 on the partition walls 14, and thus this is not preferable.

When viewed from the flow direction of the exhaust gas G (in a longitudinal direction), the gas flow paths 12 have a structure in which an upstream side end and a downstream side end are clogged in an alternate manner, that is, the flow paths 12 include the inflow cell 12A in which an upstream side (an inflow surface side) that is an inflow side of the exhaust gas G is opened, and an outflow cell 12B in which a downstream side (discharge surface side) from which the purified gas C is discharged is opened.

Here, the flow of the exhaust gas in the DPF 10 is shown in FIG. 2. The exhaust gas G containing the particulate matter 30, which flows in from the inflow surface side, that is, the end surface α side, flows into the DPF 10 from the inflow cell 12A that is opened to the inflow surface side, and passes through the partition walls 14 of the filter base body 11 while flowing through the inside of the inflow cell 12A from the end surface a side to the end surface γ side. At this time, particulate matter 30 contained in the exhaust gas G is trapped and removed by the porous film 13 that is provided on the inner wall surface 12a (a surface of each of the partition walls 14 making up the inflow cell 12A) of the inflow cell 12A, and the purified gas C from which the particulate matter 30 is removed flows inside the outflow cell 12B from the end surface α side to the end surface γ side and is discharged from an opening end side (the end surface γ side) of the outflow cell 12B to the outside of the filter.

Figure 3:
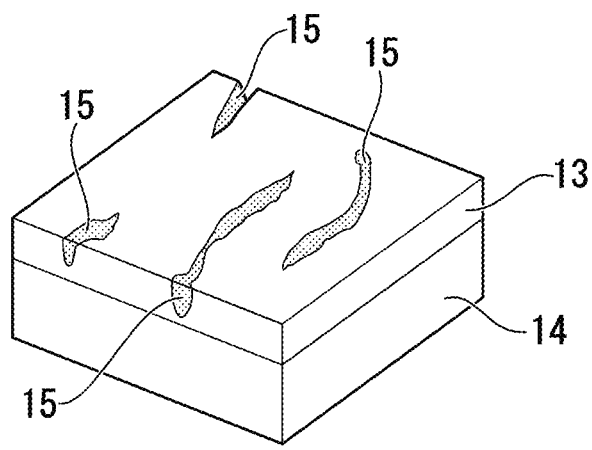
FIG. 3 is a schematic view illustrating a surface state in an inner surface of the exhaust gas purification filter of the invention.

In addition, as shown in FIG. 3, the porous film 13 is formed on at least a part of the inner wall surface 12a of the inflow cell 12A (the surface of each of the partition walls 14 making up the inflow cell 12A), and a plurality of shallow microgrooves 15 are formed in the porous film 13. A depth of the microgrooves 15 is smaller (shallower) than the film thickness of the porous film 13. That is, the microgrooves 15 are not formed in a slit shape penetrating through the porous film 13, and when viewed in the thickness direction of the porous film 13, cracking of the porous film, which makes up the microgrooves 15, converges midway.

This porous film 13 is formed on the inner wall surface 12a of the inflow cell 12A as an independent film without penetrating too far into the pores of the porous ceramics making up the partition walls 14 of the filter base body 11. That is, the porous film 13 is formed on the inner wall surface 12a of the inflow cell 12A in a state of penetrating to only an entrance portion of each of pores that are formed in the partition walls 14. In addition, the porous film 13 has a plurality of pores, and these pores communicate with each other, and as a result thereof, the porous film 13 is configured by a filter-like porous material having penetration holes.

In this exhaust gas purification filter 10, the porous film 13 having a pore size smaller than that of pores of the partition walls 14 is formed on the inner wall surface 12a of the inflow cell 12A, and the microgrooves 15 having the depth shallower than the film thickness of the porous film 13 are formed in the surface of the porous film 13 at least a part thereof. Therefore, due to the effect of providing the microgrooves 15, high trapping efficiency of the particulate matter 30 and low pressure loss can be achieved. That is, as will be described later in detail, in the porous film 13, at a portion in which the microgrooves 15 are provided, the effective film thickness of the porous film 13 becomes small, and thus the pressure loss decreases. In addition, when the microgrooves 15 are formed, a surface area of the porous film 13 can be broadened, and thus the exhaust gas purification filter 10 can realize high trapping efficiency. In addition, when the main component of the porous film 13 provided with the microgrooves 15 is composed of fine particles of silicon carbide, improvement in the regeneration treatment can be achieved.

[Porous Film]

Next, the porous film 13 that is formed on the partition walls 14 and the microgrooves 15 that are formed in the porous film 13 will be described in detail. Here, first, the porous film 13 will be described in detail.

As a material that forms the porous film 13, heat-resistant ceramic materials such as silicon carbide, silicon nitride, aluminum oxide, zirconium oxide, cordierite, and aluminum titanate can be used, but it is not particularly limited thereto. However, as described later, when it is intended to shorten the treatment time or to lower the treatment temperature during the regeneration treatment of the exhaust gas purification filter 10, it is preferable to use the silicon carbide as the main component. The porous film 13 is formed by sintering the particles of the ceramic material. In addition, in the invention, the term sintering refers to contact portions between particles of the ceramic material that forms the porous film 13 being bonded to each other when being heated, and pores remaining between particles.

In addition, in a case where a catalyst is supported by the porous film 13, an appropriate material for exhibiting catalytic characteristics is preferably selected. In addition, an oxide itself such as a cerium oxide that has catalytic activity can be used as the material of the porous film 13.

Furthermore, as described later, the porous film 13 can be obtained by applying a coating material in which particles of a ceramic material are dispersed on the surfaces of the partition walls 14 to form an applied film of the particles of the ceramic material and by drying and sintering this applied film. Therefore, a sintering additive can be added in a range not deteriorating characteristics of the porous film 13.

The film thickness of the porous film 13 having the microgrooves 15 is preferably 5 to 80 μm, and more preferably 8 to 60 μm.

When the film thickness of the porous film 13 is less than 5 μm, in the case of providing the microgrooves 15 in a film surface, the microgrooves 15 have a tendency to have a slit shape penetrating through the porous film 13, and thus it is not likely to form the microgrooves 15 that are desired. Therefore, this is not preferable. In addition, even when the microgrooves 15 are formed without penetrating through the porous film 13, the microgrooves 15 become too small (too shallow), and thus the microgrooves 15 have a tendency to be buried with a PM deposition material. Therefore, there is no difference to a case in which the microgrooves 15 are not provided (the microgrooves 15 do not function in an effective manner), and thus this is not preferable.

On the other hand, when the film thickness exceeds 80 μm, even when the microgrooves 15 are present, the pressure loss due to the porous film 13 becomes large, and as a result, there is a concern that there can be caused a decrease in engine output or deterioration in fuel efficiency of an engine to which the exhaust gas purification filter 10 of the invention is attached, and thus this is not preferable.

In addition, a volume ratio of a solid content in the porous film 13 is preferably 10 to 70%, and more preferably 15 to 50%.

When the volume ratio of the solid content of the porous film 13 exceeds 70%, since an average porosity of the porous film 13 becomes lower than that of the filter base body 11, even when the microgrooves 15 are present, an increase in pressure loss in the porous film 13 is caused. As a result thereof, there is a concern that there can be caused a decrease in engine output or deterioration in fuel efficiency of an engine to which the exhaust gas purification filter 10 of the invention is attached, and thus this is not preferable. In addition, there is a concern that a cost increase factor can arise in the exhaust gas purification filter. The average porosity of the porous film 13 is set to be equal to that of the filter base body 11. That is, even in a case in which an effect due to the microgrooves 15 is not considered, the volume ratio of the solid content is more preferably 50% or less in order to realize a range not causing the pressure loss.

On the other hand, in a case where the volume ratio of the solid content of the porous film 13 is less than 10%, since a structure member is too small, there is a concern that it is difficult to maintain the structure or strength of the porous film 13. Particularly, in a portion at which the microgrooves 15 are present, the film thickness of the porous film 13 becomes small, and thus the strength of the film itself decreases. Therefore, it is preferable that the volume ratio of the solid content be 15% or more.

It is preferable that the average pore size of the porous film 13 be 0.05 to 3 μm, more preferably 0.06 to 3 μm, and still more preferably 0.1 to 2.5 μm.

In this manner, the average pore size of the porous film 13 is smaller than a pore size of the partition walls 14 (that is, the average pore size of the DPF in the related art: approximately 5 to 50 μm). Therefore, practically, the particulate matter 30 hardly penetrates into the partition walls 14, and is trapped by the porous film 13 with high efficiency from a stage in which a deposition amount is small.

The reason why the average pore size of the porous film 13 is set to be within the above-described range is as follows. That is, when the average pore size is 0.05 μm or less, in a case where the exhaust gas containing particulate matter is made to flow into the exhaust gas purification filter 10, the pressure loss becomes large even when the microgrooves 15 are formed. In addition, when the average pore size of the porous film 13 exceeds 3 μm, the pore size of the porous film and the pore size of the partition walls 14 become substantially the same, and thus there is a concern that the trapping efficiency of PM is not improved.

In addition, the volume ratio of the solid content and the average pore size of the porous film 13 may be uniform in the porous film 13, but as described later, it is more effective in a gradient structure in which a difference in these values is given between a surface side and a filter base body 11 side of the porous film 13.

[Microgrooves]

Next, the microgrooves 15 will be described in detail. In the following description, among lengths in a surface direction on a surface in which the micro grooves 15 are formed, a length in a longitudinal direction is called a "length" of the microgrooves 15, and a length in a lateral direction is called a "width" of the microgrooves 15.

It is preferable that the width of the microgrooves 15 be 1 μm or more, and more preferably 3 μm.

Here, in a case where the width of the microgrooves 15 is less than 1 μm, openings of microgrooves become too narrow, and thus the openings are easily buried with a PM deposition material. Therefore, the microgrooves do not effectively function as the microgrooves 15, and thus this is not preferable. On the other hand, even though the upper limit of the width of the microgrooves 15 is not limited from an aspect of shape or function, in a case of using a manufacturing method to be described later, it is difficult to form a microgroove having an opening width exceeding 10 μm, and thus 10 μm is set as a reference.

In addition, although the length of the microgrooves 15 is not particularly limited, a length of 10 to 200 μm is set as a reference. This is because, in the case of using the manufacturing method to be described later, an opening length of approximately 10 μm to the minimum is necessary to form the microgrooves 15 having a width of 1 μm. On the other hand, the film thickness of the porous film 13 at a portion in which the microgrooves 15 are formed becomes small due to the microgrooves 15, and thus the strength thereof decreases. Therefore, when the length exceeds 200 μm, there is a problem in that cracking occurs from the portion, or the like. As a result, it is considered that the length of the microgrooves 15 can be set to 200 μm or less.

A depth of the microgrooves 15 can be shallower than the film thickness of the porous film 13 at a portion in which the microgrooves 15 are formed in the porous film 13. That is, it is preferable that the microgrooves 15 do not have a slit shape penetrating through the porous film 13, and the cracking of the porous film 13 in which the microgrooves 15 are formed converges midway in the porous film 13.

However, when the depth of the microgrooves 15 becomes deeper than 50% of the film thickness of the porous film 13, in addition to a problem in that the strength of the porous film 13 at a portion in which the microgrooves 15 are formed deteriorates, there is a concern that thermal stress due to high-temperature repetitive hysteresis accompanying use as the exhaust gas purification filter can be focused to the microgrooves 15, and thus cracking on the bottom of the microgrooves 15 may progress, thereby resulting in a penetration hole. In addition, when the depth of the microgrooves 15 becomes shallow to be less than 10% of the film thickness of the porous film 13, the effect of providing the microgrooves 15 to be described later is not likely to be obtained. Therefore, it is preferable that the depth of the microgrooves 15 be 10 to 50% of the film thickness of the porous film 13 at a portion in which the microgrooves 15 are formed, and more preferably 20 to 30%.

In addition, when a projection area of the porous film 13 in a film surface direction is set as F, and a projection area of the microgrooves 15 in the same direction is set as G, it is preferable that a presence ratio of the microgrooves 15 in the surface of the porous film 13 satisfy an equation of $0.05 \leq G/F \leq 1$.

When describing F and G in a more specific manner, in a case where a surface of the porous film 13 is photographed, the entire area of the photograph is F, and the sum of areas that are recognized as the microgrooves 15 in the photograph is G.

Here, the reason why the minimum value of G/F is set to 0.05 is that when the G/F value is less than 0.05, the amount of the microgrooves 15 is too small, and thus an effect of providing the microgrooves 15 can not be obtained.

On the other hand, in a state in which the microgrooves 15 are formed in the entirety of the porous film 13, that is, in a state in which the microgrooves 15 adjacent to each other come into contact with each other on an original surface of the porous film 13, the number of microgrooves 15 becomes maximum, and thus the effect of providing grooves can be obtained. In this case, values of G and F become the same as each other, and thus the maximum value of G/F becomes 1.

In addition, in a case where the microgrooves 15 are formed, for example, by partially etching the porous film 13, when the etching is made to progress further from a point of time reaching G/F=1, an effective amount of grooves decreases conversely, but in a method to be described later, this does not occur.

In addition, it is preferable that the microgrooves 15 be approximately uniformly distributed on the entire surface of the porous film 13. That is, it is preferable that a plurality of microgrooves 15 be formed not only in a corner portion (a portion at which faces making up the partition walls 14 come into contact with each other) in the inner wall surface 12a but also in a planar portion in the inner wall surface 12a.

That is, as described later in detail, the porous film 13 is formed by a wet method in which a coating material, in which particles of a ceramic material as a material that forms the porous film 13 are dispersed, is applied to form an applied film and the applied film is dried and sintered. In this case, when a cross-sectional shape of the inflow cell 12A is a polygonal shape such as a rectangular shape, in a corner portion, the film thickness of a coated film containing the particles of the ceramic material becomes larger than that of the planar portion due to a surface tension of the coating material. At the corner portion in which the film thickness of the coated film is large, it is easy to form the microgrooves 15, but this corner portion does not exhibit a filter operation largely. However, when the microgrooves 15 are also formed in the planar portion, PM can be effectively trapped from the exhaust gas passing through each of the microgrooves 15, and thus a high effect can be obtained.

When these microgrooves 15 are provided, the film thickness of the porous film 13 at a portion in which the microgrooves 15 are provided becomes smaller than that of other portions, and thus pressure loss is also reduced. Therefore, the same effect as a case of reducing the effective film thickness of the porous film 13 can be obtained. Here, it is difficult to make the film thickness of the entirety of the porous film 13 be a constant value or less. Particularly, it is technically difficult to form the porous film 13 that is thin on a hole of the filter base body 11 without a support, but when the microgrooves 15 are provided in the porous film 13 like in the invention and the effective film thickness is made to be small, the film thickness at a place in which the microgrooves 15 are not provided can be large, and thus it is possible to avoid this problem and the formation can be easy.

Here, it is experimentally confirmed that the pressure loss is reduced at a portion in which the microgrooves 15 are provided. In a case where PM trapping is carried out by using the porous film 13 having the microgrooves 15, it is confirmed that at an early stage of use, PM is selectively trapped by the microgrooves 15 and is attached to a wall surface of the microgrooves 15 to a certain degree, and then the trapping progresses in the entirety of the porous film 13 having the microgrooves 15.

This is considered to be because the pressure loss in the microgrooves 15 is further reduced (flow loss is reduced) than a portion in which the microgrooves 15 are not provided, and thus the following operation is exhibited. That is, at the early stage of use, exhaust gas flows selectively to microgrooves 15, and thus PM is selectively trapped in the microgrooves 15. In addition, it can be considered that when a certain amount of PM is trapped on the surface of the microgrooves 15, the pressure loss at a portion in which the microgrooves 15 are provided and a portion in which the microgrooves 15 are not provided become substantially the same as each other, and then exhaust gas flows through the entirety of the porous film 13 regardless of whether or not the microgrooves 15 are present and PM is trapped in the entirety of the porous film.

Furthermore, when the microgrooves 15 are provided, an effective surface area of the porous film 13 can be increased. For example, when a surface area of the porous film 13 in the case of not having the microgrooves 15 is set as X, in a case where grooves having an inclination angle θ with respect to a surface are formed in the surface of the porous film 13, the surface area of the porous film 13 increases to X/cos θ. When the surface area of the porous film 13 increases, a decrease in pressure loss and an increase in PM trapping amount are achieved, and thus the exhaust gas purification filter 10 in which characteristics are improved can be realized.

When the microgrooves 15 are formed in the surface of the porous film 13, the exhaust gas purification filter 10, in which both high trapping efficiency of PM and low pressure loss are achieved, can be obtained. However, when the pore size or porosity of the porous film 13 has a gradient structure in which the pore size or porosity is small on a surface portion of the porous film 13, and is large on the filter base body 11 side, more preferable characteristics can be obtained.

That is, it is preferable that the pore size inside the porous film 13 be smaller than that of the filter base body 11 at a portion in which the porous film 13 comes into contact with the filter base body 11, and the pore size decrease toward a surface portion of the porous film 13, and thus the pore size of the surface portion of the porous film 13 be further smaller than that at the inside of the film.

In addition, in regard to the porosity, it is preferable that the porosity at a portion in which the porous film 13 comes into contact with the filter base body 11 be high and the porosity decrease as it goes toward the surface portion of the porous film 13, and thus the porosity at the surface portion of the porous film 13 be lower than that at the inside of the film.

In the porous film 13 having this gradient structure, the pressure loss is the highest on the surface of the porous film 13, and decreases as it goes toward the inside of the film, and is the lowest at a portion in which the porous film 13 comes into contact with the filter base body 11. On the other hand, the PM trapping efficiency is the highest on the surface of the porous film 13, and decreases as it goes toward the inside of the film, and is the lowest at a portion in which the porous film 13 comes into contact with the filter base body 11.

When the microgrooves 15 are formed in the porous film 13 having this inclination structure, at portions of the microgrooves 15, the inside of the porous film 13, that is, portions in which the pressure loss is low and thus the trapping efficiency becomes inferior to that on the surface are exposed as a surface of the porous film 13. In addition, the further a position from the surface of the porous film 13 is deep, the further the pressure loss is low and thus the further the trapping efficiency becomes inferior to that of the surface. Therefore, as the depth of the microgrooves becomes deep, a portion in which the pressure loss is low and the trapping efficiency is further decreased is exposed.

That is, when the microgrooves 15 are formed, it is possible to control the pressure loss and the PM trapping efficiency by the depth of the microgrooves 15. Therefore, a balance between the pressure loss and the trapping efficiency can be adjusted by adjusting the depth of the microgrooves 15, and thus the exhaust gas purification filter 10 having satisfactory characteristics can be obtained.

In addition, the porous film 13 having such a pore size or porosity distribution can be obtained by mixing two kinds or more of particles in which particle sizes are different from each other and by forming the porous film 13 using the resultant mixture. That is, as described later, this porous film 13 can be obtained by carrying out formation of the porous film 13 by using a coating material obtained by mixing two or more kinds of particles having particle sizes different from each other and by dispersing the resultant mixture in a dispersion medium.

(Use of Silicon Carbide)

When silicon carbide is selected as a main component of a material of the porous film 13, shortening of a treatment time or lowering of a treatment temperature can be realized during a regeneration treatment of the exhaust gas purification filter 11. The reason for this is considered to be the following.

Moreover, here, the main component represents a case in which among components making up the porous film 13, a presence amount of the silicon carbide exceeds 50% by volume, and in a case where the silicon carbide makes up a composite carbide with other material, comparison is made after conversion into a carbide for each component.

It is known that when the porous film is formed using fine particles of silicon carbide of which a primary particle size is several to several hundred nm, combustion efficiency of particulate matter trapped on the porous film can be improved without adding a specific oxidation catalyst, and a combustion time of the particulate matter can be shortened during regeneration of the exhaust gas purification filter (for example, refer to WO 2009/133857).

On the other hand, in an exhaust gas purification filter formed from silicon carbide in the related art (without a porous film), the effect of improving combustion efficiency of the particulate matter is not provided.

That is, it is considered that a porous film that is formed using silicon carbide fine particles having a nanometer size has any catalytic effect (a combustion promoting effect) with respect to the combustion efficiency of the particulate matter.

Here, the present inventors confirmed that oxygen is adsorbed to silicon carbide when silicon carbide is heated at several hundred ° C. in an oxygen atmosphere. It is considered that this adsorbed oxygen exhibits the catalytic effect (oxidation of the particulate matter at a low temperature, an increase in a conversion ratio to CO or $CO_2$, and the like at a low-temperature region) with respect to the combustion efficiency of the particulate matter. When it is assumed that the catalytic effect with respect to the combustion efficiency of the particulate matter is obtained due to the adsorbed oxygen of silicon carbide, the further the number of silicon carbide particles that come into contact with the particulate matter increases, the further combustion efficiency of the particulate matter is improved.

The particle size of the particulate matter is larger than that of the fine particles of the silicon carbide that is used, and thus the particulate matter trapped in the porous film that is formed from the fine particles of silicon carbide is maintained by a plurality of fine particles of silicon carbide. Therefore, it is considered that combustion efficiency of the particulate matter that comes into contact with the plurality of fine particles of silicon carbide is improved.

On the other hand, the silicon carbide particles, which make up an exhaust gas purification filter formed from silicon carbide in the related art, have a particle size larger than that of the particulate matter, and thus the number of silicon carbide particles that come into contact with the particulate matter is small and a contact area between the particulate matter and the silicon carbide particles becomes smaller than that in the case of using silicon carbide fine particles. Therefore, it is considered that the combustion efficiency of the particulate matter is not improved.

Therefore, how many silicon carbide fine particles having a nanometer size are made to come into contact with the particulate matter is important for improvement of the combustion efficiency of the particulate matter.

Here, in the porous film 13 having the microgrooves 15 of the invention, since the effective surface area of the porous film 13 increases due to formation of the microgrooves 15, the particulate matter that directly comes into contact with the porous film 13 further increases compared with a porous film not having microgrooves.

In addition, at portions of the microgrooves 15, since pressure loss is reduced (flow loss decreases), a large amount of particulate matter is trapped in the microgrooves 15. On the other hand, since these microgrooves 15 serve as a large passage of exhaust gas during regeneration treatment of the exhaust gas purification filter 11, the particulate matter in the microgrooves 15 is put into the inside of the microgrooves 15 during the regeneration treatment. Therefore, the particulate matter in the microgrooves 15 is always put into the inside of the microgrooves 15 having a large surface area and comes into contact with the porous film.

Therefore, when the porous film 13 having the microgrooves 15 is formed by using silicon carbide fine particles having a nanometer size, an amount of particulate matter, which directly comes into contact with the silicon carbide fine particles (a contact area between the silicon carbide fine particles and the particulate matter), increases largely compared to a silicon carbide porous film not having microgrooves. Therefore, a higher catalytic effect with respect to combustion efficiency of the particulate matter can be obtained and thus improvement of combustion efficiency can be also realized.

In this manner, when silicon carbide is selected as a main component of a material of the porous film 13, combustion efficiency of the particulate matter during the regeneration treatment of the exhaust gas purification filter 11 is improved, and thus shortening of a regeneration treatment time or lowering of a treatment temperature can be realized.

[Method of Manufacturing Exhaust Gas Purification Filter]

Next, a method of manufacturing an exhaust gas purification filter 10 of the invention will be described.

The method of manufacturing an exhaust gas purification filter 10 of the invention includes a step of preparing a coating material containing at least a particle component for forming a porous film and a dispersion medium, a step of applying the coating material on a surface of a filter base body to form an applied film, a step of removing a part of the dispersion medium in the applied film to form a coated film in which fluidity is lost, and a step of further removing the dispersion medium in the coated film in which fluidity is lost to form microgrooves 15 in a surface of the coated film.

According to this manufacturing method, a part of a dispersion medium in the applied film is removed to form a coated film in which fluidity is lost, and then the dispersion medium is further removed from the coated film in which fluidity is lost to cause volume contraction, thereby generating contraction stress in the coated film. At this time, on the surface of the coated film, the contraction stress becomes larger than a binding force of the coated film, and thus cracking occurs, whereby the microgrooves 15 are formed. On the other hand, the coated film is fixed to the filter base body 11 on a filter base body 11 side of the coated film. Therefore, even when the dispersion medium is removed, the volume contraction can be hindered, whereby cracking does not occur. As a result thereof, the microgrooves 15 can be formed in the surface of the coated film.

Hereinafter, a description will be made sequentially.

(Step of Preparing Coating Material)

First, a coating material containing particles to form the porous film 13 in a dispersed manner is prepared.

As a material of the particle component, heat-resistant ceramic materials such as silicon carbide, silicon nitride, aluminum oxide, zirconium oxide, cordierite, and aluminum titanate can be used, but it is not particularly limited thereto. This material is preferably determined in consideration of a combination with the filter base body 11. In addition, in a case where a catalyst is supported by a porous film, an appropriate material for exhibiting catalytic characteristics is preferably selected. In addition, an oxide itself such as ceria that has a catalytic activity (an effect of promoting combustion of particulate matter) can be used as the material of the porous film 13.

In addition, a catalytic component to provide an effect other than particulate matter trapping performance to an exhaust gas purification filter, a sintering additive to form a porous film, and the like can be added.

It is preferable that an average primary particle size of the particle component be 0.01 to 4 µm, and more preferably 0.01 to 1 µm.

The reason why the average primary particle size is preferably 0.01 to 4 µm is because when the average primary particle size is less than 0.01 µm, a pore size of a porous film that is generated becomes too small, and thus there is a concern that pressure loss becomes larger when exhaust gas containing particulate matter is made to flow to the exhaust gas purification filter 10 that is obtained. On the other hand, when the average primary particle size exceeds 4 μm, the pore size of the porous film becomes larger, and thus there is no substantial difference with that of a filter base body, whereby there is a concern that particulate matter trapping efficiency is not improved.

In addition, to provide a gradient structure in a pore size and porosity of the porous film, it is also preferable to use particles having a plurality of particle sizes in combination as described later.

The coating material to form the porous film is adjusted by dispersing the particle component in the dispersion medium.

In addition, a fluidity control agent or a resin component to be described later can be added according to necessity.

A dispersing process is preferably carried out in accordance with a wet method. As a disperser that is used in this wet method, both an opened type and a closed type can be used, and for example, a ball mill, an agitation mill, and the like can be used.

As the ball mill, a rolling ball mill, a vibration ball mill, a planetary mill, and the like can be used. In addition, as the agitation mill, a column-type mill, an agitation tank-type mill, a flow tube-type mill, a tubular mill, and the like can be exemplified.

As the dispersion medium, water or an organic dispersion medium can be appropriately used.

As the organic dispersion medium, for example, alcohols such as methanol, ethanol, propanol, diacetone alcohol, furfuryl alcohol, ethylene glycol, and hexylene glycol; esters such as methyl acetate ester, and ethyl acetate ester; ether alcohols such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and ethylene glycol monoethyl ether; ethers such as dioxane and tetrahydrofuran; ketones such as acetone, methyl ethyl ketone, acetyl acetone, acetoacetic ester; acid amides such as N,N-dimethyl formamide; aromatic hydrocarbons such as toluene and xylene, and the like can be appropriately used. One or two or more kinds of these dispersion media can be used.

In addition, to increase affinity between the particle component and the dispersion medium, a surface treatment of the particle component can be carried out. It is preferable to select a surface-treating agent in accordance with a material of the particle component and a kind of the dispersion medium, and as the surface-treating agent, for example, alkoxysilane such as tetramethoxysilane and tetraethoxysilane; aluminum alkoxides such as trimethoxy aluminum and triethoxy aluminum; zirconium alkoxides such as tetramethoxy zirconium, and tetraethoxy zirconium; titanium alkoxides such as tetramethoxy titanium and tetraethoxy titanium; silane coupling agents such as 3-aminopropyltrimethoxysilane and 3-aminopropyltriethoxysilane; aluminum-based coupling agents such as acetoalkoxy aluminum diisopropylate; zirconium-based coupling agents such as ammonium zirconium carbonate; titanium-based coupling agent such as titanium ethyl acetoacetate and titanium isopropoxy octylene glycolate; nonionic surfactants such as glycerin fatty acid ester and aliphatic alcohol ethoxylate; cationic surfactants such as hexadecyltrimethylamounium; anionic surfactants such as dialkyl sulfosuccinate and alkyl ether carboxylate; amphoteric surfactants such as hydrochloric acid alkyl diaminoethyl glycine; higher fatty acids such as a stearic acid or a salt thereof; phosphate esters such as alkyl phosphate ester; and the like can be appropriately used, but it is not limited thereto. Any surface modifier having a functional group that is adsorbed to a surface of a particle component and a terminal group that has affinity with the dispersion medium can be used.

In addition, in a case where the particle component is a non-oxide type such as carbide-based non-oxide and nitride-based non-oxide, the surface treatment can be carried out by subjecting the particle surface to oxidization or hydration treatment instead of using the surface-treating agent.

In addition, a dispersant, a surfactant, an antiseptic agent, a stabilizing agent, a deforming agent, a leveling agent, and the like can be added to the dispersed solution of the particle component that is obtained as described above.

As the dispersant, for example, organic polymers such as polycarboxylic acid ammonium salt, polyethylene glycol, polyvinyl alcohol, and polyvinylpyrrolidone, and the like can be used.

In addition, the surface-treating agent, the dispersant, the surfactant, the antiseptic agent, the stabilizing agent, the deforming agent, the leveling agent, and the like also often have an effect as a fluidity control agent or a resin component to be described later, and thus in the case of adding these components, it is necessary to add these components in consideration of not only properties as a dispersant and a coating material but also formation conditions of the microgrooves 15.

This is because the formation of the microgrooves 15 is not determined uniquely by the addition of the surface-treating agent, the dispersant, the surfactant, the antiseptic agent, the stabilizing agent, the deforming agent, the leveling agent, and the like, and the fluidity control agent, the resin component, and the like that are described later, but is determined by an overall action of various conditions including a kind of dispersant, a condition of removing the dispersant, a particle size of a particle component, a thickness of a coated film, and the like.

In this manner, it is possible to prepare the coating material to form the porous film in which the particle component is dispersed in the dispersion medium, and the surface-treating agent, the dispersant, the surfactant, the antiseptic agent, the stabilizing agent, the deforming agent, the leveling agent, and the like are added according to necessity.

(Step of Forming Applied Film)

Next, the coating material is applied to the inner wall surface of the partition walls 14 of the filter base body 11, that is, the inner wall surface 12a of the gas flow path 12 on the inflow cell 12A side to form an applied film.

As a method of applying the coating material, a common wet coat method such as a bar coat method, a slip cast method, a wash coat method, a dip coat method, and the like, which apply an application solution to a surface of an object to be processed, can be used.

(Step of Forming Microgrooves 15)

Next, a part of the dispersion medium in the above-described applied film is removed to form a coated film in which fluidity is lost, and then the coated film is heat-treated to form the porous film 13 having the microgrooves 15 on the inner wall surface 12a of the gas flow path 12 of the filter base body 11.

Here, a method of causing the application solution to lose fluidity is not particularly limited, but for example, the following method can be used.

As the simplest method, a method can be exemplified in which a system only containing the particle component and the dispersion medium is set as the coating material, and a composition of the particle component and a component of the dispersion medium, a particle size of the particle component, and a ratio between the particle component and the dispersion medium are adjusted to significantly decrease fluidity in a state in which the dispersion medium remains, thereby causing the application solution to lose the fluidity. In this method, a component other than the particle component is not contained in the coating material, and thus there is no problem caused by an addition component, such as mixing-into of impurities. However, a condition range which causes the coated film to lose fluidity and causes cracking to occur only in a surface of the coated film is narrow, and it is necessary to match selection of a particle size to obtain necessary characteristics of the porous film 13 and selection of a particle size to realize fluidity loss. Therefore, it is necessary to perform the adjustment in an appropriate manner.

As another method, a method in which a fluidity control agent that causes the fluidity loss of the application solution to occur easily is added to the coating material can be exemplified. When adjusting the coating material using a dispersed solution of the particle component, the adjustment of the coating material containing the fluidity control agent can be performed by simultaneously mixing the fluidity control agent.

As the fluidity control agent, a material which realizes fluidity loss due to steric hindrance of the fluidity control agent or due to formation of a steric structure in the fluidity control agent by a hydrogen bond can be selected. As a representative of this material, an organic polymer having a gelation operation can be exemplified.

As a gelation method of the fluidity control agent, an arbitrary method such as a high concentration by partial removal of a solvent (dispersion medium), variation of temperature (heating or cooling), and variation of pH can be used. Examples of the organic polymer having the gelation operation include agar, gelatin, glue, methyl cellulose, ethyl cellulose, carrageenan, alginate, and the like.

In addition, as another fluidity control agent, an organic monomer or oligomer that is polymerizable under the presence of a dispersion medium can be selected. This organic monomer or oligomer can realize fluidity loss by being polymerized in a state in which the dispersion medium remains to form a polymer steric structure. As this organic monomer or oligomer, an organic monomer or oligomer in which polymerization occurs when the dispersion medium is removed and the high concentration is obtained can be appropriately selected. For example, an organic monomer or oligomer which contains a reaction group such as a vinyl group, an acryloyl group, an epoxy group, and an isocyanate group, or one or two or more of small-membered rings (three to six-membered rings) that are concentrated and cause ring-opening polymerization can be exemplified.

In addition, as a component that becomes a raw material of the particle component or a raw material of the sintering additive component, alcoholates or esters of silicon, aluminum, zirconium, titanium, and the like, and the organic monomer or oligomer as described above can be used in combination.

In addition to this, as another fluidity control agent, a polymer and a metal ion that generate an ionomer can be exemplified. As a combination of the polymer and the metal ion that generate an ionomer, a combination of an ethylene-(meth)acrylic acid copolymer and an alkali metal or an alkali earth metal can be exemplified.

One kind of these polymer materials and reactive materials can be used, and two or more kinds can be used in combination.

The dispersion medium is further removed from the coated film that lost fluidity, and a volume contraction is caused to form the microgrooves 15 due to cracking on a surface of the coated film.

Dimensions (width and depth) and a shape of the microgrooves 15, and the number of microgrooves per unit area can be controlled by adjusting the thickness of the coated film, a content of the dispersion medium at the point of time at which fluidity is lost, dispersion medium removing conditions (in the case of heating and removing the dispersion medium, a heating temperature, a heating time, and the like), and the like.

In addition, as a method of removing the dispersion medium to form the microgrooves 15, in general, a method of evaporating and removing the dispersant medium through heating is used. However, depending on a kind of the fluidity control agent, since fluidity can be restored due to heating, reduced-pressure drying or the like is used in such a case. In addition, in regard to a method of removing a part of the dispersion medium in the coated film to form the coated film that loses fluidity, in a case of heating the coated film, the method can be executed by a continuous heating treatment process in conjunction with a step of forming a coated film that loses fluidity and a step of forming the microgrooves 15.

In this manner, the porous film 13 is formed by heating the coated film in which the microgrooves 15 are formed.

The heat treatment temperature of the coated film is different depending on a material of the particle component or the like, but the temperature can be equal to or higher than a temperature at which the organic component in the coated film is removed and the particle component starts to be sintered (contact portions between particle components are bonded due to heating). The temperature is preferably 500° C. to 2,000° C., and more preferably 600° C. to 1,800° C.

In addition, the heat treatment time is preferably 0.5 to 10 hours, and more preferably 1.0 to 4 hours.

Furthermore, a heat treatment atmosphere is not particularly limited, but the heating treatment of the coated film can be performed in a reducing atmosphere such as hydrogen and carbon monoxide; an inert atmosphere such as nitrogen, argon, neon, and xenon; an oxidizing atmosphere such as oxygen and the air. These atmospheres can be appropriately selected in accordance with a kind of coating material (a material of a particle component, and a kind of a reactive material or polymer material that is used).

In addition, in a case where two or more kinds of particles having particle size different from each other are mixed and dispersed in the coating material, when the porous film 13 is formed by applying this coating material to form the applied film, it is possible to form the porous film 13 having a gradient structure in which a pore size and porosity become smaller on a surface portion of the porous film 13 and is larger on a filter base body 11 side.

For example, in regard to a method of manufacturing an exhaust gas purification filter 10 of the invention, in the case of using two kinds of particles having particle sizes different from each other as the particle component, when a first particle containing particles having a primary particle size of 10 nm to 120 nm in 90% by volume or more, and a second particle containing particles having a primary particle size of 300 nm to 1,000 nm in 90% by volume or more are mixed in a volume ratio (the volume of the first particle:the volume of the second particle) within a range of 3:97 to 97:3 and the resultant mixture is used as the particle component, it is possible to obtain a porous film which has a pore size and porosity that are appropriate for the exhaust gas purification filter 10 of the invention, and in which the pore size and porosity on the surface side is small and is large on the filter base body side.

In addition, a degree of a gradient structure, that is, actual values of the pore size and porosity or a variation degree thereof can be adjusted by adjusting the primary particle size of the first and second particles and a mixing ratio of both of these.

In addition, even when one kind of particle in which a particle size distribution is broad is selected instead of mixing two kinds or more of particles having pore sizes different from each other, the same effect can be obtained.

Here, the first particle has a small particle size, and thus enters a state in which the first particle can freely move in the dispersion solution due to Brownian motion or the like, but the second particle has a large particle size, and thus there is a high probability that the second particle is not freely move in the dispersion solution and moves accompanying the flow of the dispersion medium.

On the other hand, in a case where the coating material is applied to the filter base body 11, there occurs a phenomenon in that a surface tension acts on a surface of a coated film, evaporation of the dispersed solution occurs, and on a filter base body 11 side, the dispersion medium is absorbed and is diffused to the filter body 11.

Therefore, when the dispersion medium is absorbed with respect to the filter base body 11 to a certain degree, the second particle moves to the filter base body 11 side along with the flow of the dispersion medium. On the other hand, in the first particle, this movement does not occur, but since the second particle is condensed to the filter base body 11 side, the first particle is collected on the surface side of the coated film. As a result, the first particle having a small particle size is collected on the surface side of the coated film, and the second particle having a large particle size is collected on the filter base body 11 side of the coated film.

When this applied film is dried and is sintered, a dense film in which the pore size and porosity are small can be obtained on the surface side in which fine particles are collected, and a coarse film in which the pore size and porosity are large can be obtained on the filter base body 11 side in which a coarse particle is collected.

In this manner, the porous film 13 having a gradient structure can be obtained.

In this manner, the exhaust gas purification filter 10 of the invention can be manufactured.

In addition, another method of manufacturing an exhaust gas purification filter 10 of the invention includes a step of preparing coating material containing at least a particle component for forming a porous film 13, a dispersion medium, and a binder component, a step of applying the coating material on a surface of a filter base body to form an applied film containing the binder component, a step of removing the dispersion medium in the applied film containing the binder component to form a cured coated film containing the binder component, and a step of removing the binder component in the cured coated film to form microgrooves 15 in a surface of the coated film.

In this method, the binder component contained in the coated film after the drying and curing is removed and thus a volume contraction is caused, whereby a compression stress is caused to occur in the coated film. On the surface of the coated film, a degree of freedom of the coated film is high, and thus when the compression stress becomes larger than a binding force of the coated film, cracking is caused to occur, whereby the microgrooves 15 are formed. On the other hand, on a filter base body side of the coated film, the coated film is fixed to the filter base body, and thus even when the dispersion medium is removed, the volume contraction is hindered, whereby the cracking does not occur.

In this manner, the microgrooves 15 can be formed in the surface of the coated film.

As a binder component that is used in this method, a material which is dissolved in the dispersion medium and which is decomposed at a lower temperature of several hundred ° C. and is removed is preferable. From these conditions, various kinds of wax as an organic polymer, a paraffin-based resin, polyvinyl alcohol, polyethylene glycol, polyvinyl pyrrolidone, and the like, which is an organic polymer, can be appropriately used.

In addition, in regard to the particle component, the dispersion medium, the additive, the dispersing method, and the applying method, these are the same as the method of further removing the dispersion medium from the coated film that lost fluidity to form the microgrooves 15, and thus a detailed description thereof will be omitted.

According to this method, since a volume variation amount before and after removing a resin component can be obtained by adjusting a ratio between the particle component and the resin component, the shape of the microgrooves and the number of the microgrooves per unit area can be controlled. Therefore, a control property is more satisfactory than the method of further removing the dispersion medium from the coated film that lost fluidity.

In addition, this method and the method in which a part of the dispersion medium in the coated film is removed to form the coated film that lost fluidity, and then the dispersion medium is further removed from the coated film that lost fluidity to cause volume contraction, thereby forming the microgrooves, can be used in combination.

According to the exhaust gas purification filter 10 configured in this manner, the exhaust gas purification filter is an exhaust gas purification filter including an inflow surface through which exhaust gas containing particulate matter flows in, a discharge surface from which purified gas is discharged, and a filter base body that is formed from a porous body. In addition, the filter base body includes porous partition walls and gas flow paths surrounded by the partition walls. The porous film having a pore size smaller than that of pores of the partition walls is provided on each surface of the partition walls, and microgrooves having a depth shallower than the thickness of the porous film are formed on at least a part of a surface of the porous film. Therefore, due to an effect of proving the microgrooves, high trapping efficiency of PM and low pressure loss can be achieved. As a result, it is possible to obtain the exhaust gas purification filter 10 having superior characteristics without discharging the PM, which becomes a cause of atmospheric pollution, to ambient air and without applying a load to an engine due to low pressure loss and thus not deteriorating fuel efficiency.

In addition, according to the method of manufacturing an exhaust gas purification filter of the invention, the method is a method of manufacturing an exhaust gas purification filter including an inflow surface through which exhaust gas containing particulate matter flows in, a discharge surface from which purified gas is discharged, and a filter base body that is formed from a porous body, wherein the filter base body includes porous partition walls and gas flow paths surrounded by the partition walls, in which a porous film having a pore size smaller than that of pores of the partition walls is provided on each surfaces of the partition wall, and microgrooves having a depth shallower than the thickness of the porous film are formed on at least a part of a surface of the porous film. The method includes a step of preparing a coating material containing at least a particle component for forming a porous film and a dispersion medium, a step of applying the coating material on a surface of a filter base body to form an applied film, a step of removing a part of the dispersion medium in the applied film to form a coated film in which fluidity is lost, and a step of further removing the dispersion medium in the coated film in which fluidity is lost to form microgrooves in a surface of the coated film. Therefore, the exhaust gas purification filter of the invention can be easily manufactured. As a result, it is possible to easily manufacture an exhaust gas purification filter having superior characteristics without discharging the PM, which becomes a cause of atmospheric pollution, to ambient air and without applying a load to an engine due to low pressure loss and thus not deteriorating fuel efficiency.

In addition, according to the method of manufacturing an exhaust gas purification filter of the invention, the method is a method of manufacturing an exhaust gas purification filter including an inflow surface through which exhaust gas containing particulate matter flows in, a discharge surface from which purified gas is discharged, and a filter base body that is formed from a porous body, wherein the filter base body includes porous partition walls and gas flow paths surrounded by the partition walls, in which a porous film having a pore size smaller than that of pores of the partition walls is provided on each surface of the partition walls, and microgrooves having a depth shallower than the film thickness of the porous film are formed on at least a part of a surface of the porous film. The method includes a step of preparing a coating material containing at least a particle component for forming a porous film, a dispersion medium, and a binder component, a step of applying the coating material on a surface of a filter base body to form an applied film containing the binder component, a step of removing the dispersion medium in the applied film containing the binder component to form a cured coated film, and a step of removing the binder component in the cured coated film to form microgrooves in a surface of the coated film. Therefore, the exhaust gas purification filter of the invention can be easily manufactured. As a result, it is possible to easily manufacture an exhaust gas purification filter having superior characteristics without discharging the particulate matter, which becomes a cause of atmospheric pollution, to ambient air and without applying a load to an engine due to low pressure loss and thus not deteriorating fuel efficiency.

Hereinbefore, a description was made with respect to preferred embodiments relating to the invention with reference to the attached drawings, but it is needless to say that the invention is not limited to the related examples. The shapes and combinations of the respective members shown in the above-described examples are illustrative only, and various modifications can be made on the basis of design request or the like within a range not departing from the gist of the invention.

EXAMPLES

Hereinafter, the invention will be described in detail with reference to examples and comparative examples, but the invention is not limited to these examples and comparative examples. In addition, in the following description, a filter that is formed is referred to as an exhaust gas purification filter.

(1) Film Thickness of Porous Film

A partition wall of the exhaust gas purification filter was broken, a cross-section of the partition wall was observed using a field emission-type scanning electron microscope (FE-SEM) S-4000 (manufactured by Hitachi High-Technologies Corporation), and an electron microscope image of a porous film of the exhaust gas purification filter was obtained. A measurement magnification was set to 400 times, and the thicknesses measured at 10 points were averaged and this average thickness was set to the thickness of the porous film.

(2) Average Pore Size and Average Porosity of Porous Film

By using a mercury porosimetry device (Pore Master 60 GT, manufactured by Quantachrome Corporation), 50% accumulation of mercury entrance volume at a film portion was set to an average pore size of the porous film of the exhaust gas purification filter. In addition, the average porosity was measured by the same device.

In addition, in the following tests (3) to (5), a test device 20 shown in FIG. 4 was used.

Figure 4:
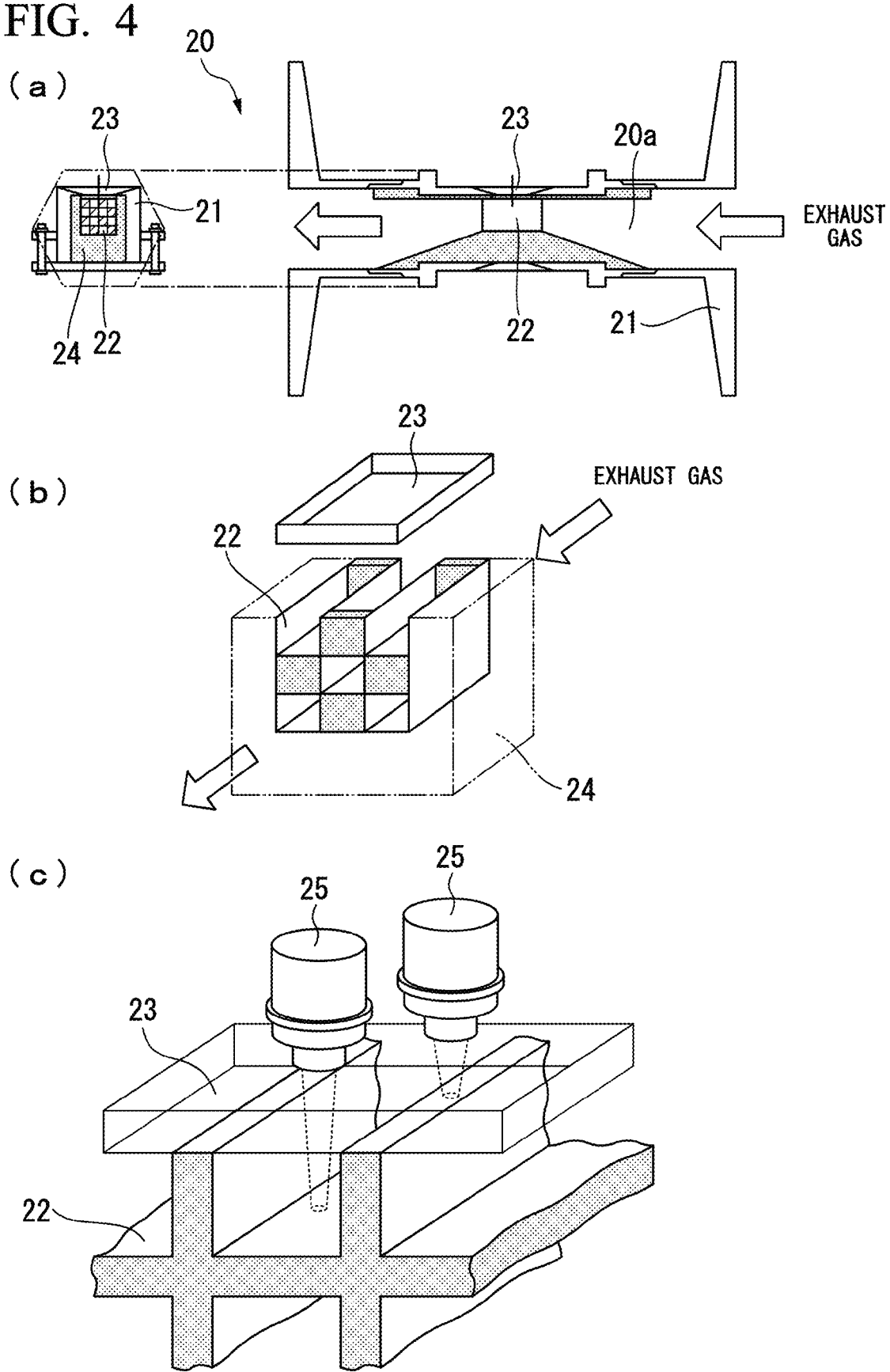
FIG. 4 is a schematic view illustrating a configuration of a testing device that is used in examples.

As shown in FIG. 4($a$), the test device 20 includes a tubular device main body 21 in which a flow path 20$a$ is formed, and in the flow path 20$a$, an exhaust gas purification filter 22 is disposed.

The exhaust gas purification filter 22 is obtained by cutting an exhaust gas purification filter that was manufactured into a rectangular parallelepiped shaped having dimensions of 5 mm×5 mm in a direction orthogonal to the flow path and 7 mm in a direction parallel with the flow path. The exhaust gas purification filter 22 that is cut includes 3×3 gas flow paths that are formed as inflow cells and outflow cells.

In addition, as shown in FIG. 4($b$), in the exhaust gas purification filter 22, an upper side one surface is removed, and an observation plate 23 formed from quartz glass is formed to come into contact with the one surface.

The exhaust gas purification filter 22 is fixed inside the flow path 20$a$ in a state of coming into contact with the observation plate 23 using an adhesive 24.

(3) Pressure Loss Test

First, dried air was introduced into the exhaust gas purification filter 22 of the test device 20, and this dried air was made to pass through partition walls of the exhaust gas purification filter 22 and was discharged from a discharge port. At this time, pressure loss at an entrance port was measured.

Next, the test device 20 was mounted in a diesel engine (Robin SGD2200, manufactured by Fuji Heavy Industries Ltd.) with a capacity of 230 mL, operation was performed at an engine speed of 3,000 rpm, and exhaust gas containing particulate matter was introduced into the flow path 20$a$ at a flow rate of 12 cm/s. In this manner, the particulate matter was deposited in the exhaust gas purification filter 22, and pressure loss in the entrance port at this time was measured at the entrance port.

In addition, a flow rate at the time of measuring the pressure loss was set to 10 cm/s.

(4) Combustion Test

The exhaust gas purification filter that was manufactured was mounted in a diesel engine with a capacity of 230 mL, and operation was performed at an engine speed of 3,000 rpm, and thus particulate matter was deposited inside the exhaust gas purification filter.

Next, the exhaust gas purification filter in which the particulate matter was deposited was heated to 600° C. in a nitrogen atmosphere, and a mixed gas of 7% oxygen and 93% nitrogen was introduced to combust the particulate matter while maintaining the temperature.

In the combustion treatment, an amount of carbon dioxide and an amount of carbon monoxide were measured by using a vehicle exhaust gas measuring device (MEXA-7500 D, manufactured by HORIBA Ltd.), and a time taken until 90% by mass of the deposited particulate matter was gasified and removed was set to an evaluation value.

(5) Observation of Exhaust Gas Purification Filter

The test device 20 was mounted in a diesel engine with a capacity of 230 mL, operation was performed at an engine speed of 3,000 rpm, and exhaust gas containing particulate matter was introduced into the flow path 20*a* to deposit the particulate matter in the exhaust gas purification filter 22.

Next, the exhaust gas purification filter 22 in which the particulate matter was deposited was heated to 600° C., and a mixed gas of 7% of oxygen and 93% of nitrogen was introduced to combust the particulate matter.

As shown in FIG. 4(*c*), a state in which the particulate matter was attached and a regeneration treatment state were observed by a microscope 25 (Focuscope FV-100C, manufactured by PHOTORON LIMITED) through the observation plate 23. An observation was performed at an inner wall of the inflow cell and at the inside of the partition walls.

Example 1

90% by mass of silicon carbide particles having an average particle size of 0.5 μm and 10% by mass of the silicon carbide particles having an average particle size of 0.03 μm were weighed to adjust a mixture of silicon carbide particles.

Next, weighing was performed in such a manner that the content of ceramic particles was set to 9.0% by volume, the content of water set to 87.0% by volume, and the content of gelatin (manufactured by Nitta Gelatine Inc.) as a gelation agent was set to 4.0% by volume. In addition, the ceramic particles and pure water were put into an agitator and mixed with a ball mill for 12 hours at a rotation speed of 60 rpm to form a slurry. Then, gelatin was added to the slurry and mixed for 15 minutes to obtain a coating material.

Then, a filter base body was dipped in the coating material, and the filter base body was raised. Then, the filter base body was dried at 100° C. for 12 hours to form a coated film, which had microgrooves formed therein and which was formed from the ceramic particles, on a surface of the filter base body.

Next, the filter base body, on which the coated film of ceramic particle was formed, was put into an atmosphere furnace, an atmosphere in the furnace was set to an argon atmosphere, and a temperature inside the furnace was raised to 1700° C. at a rate of 15° C. per minute and was maintained for 2 hours to carry out sintering, whereby an exhaust gas purification filter of Example 1 was manufactured.

Example 2

10% by mass of silicon carbide particles having an average particle size of 0.5 μm and 90% by mass of the silicon carbide particles having an average particle size of 0.03 μm were weighed to adjust a mixture of silicon carbide particles.

Next, weighing was performed in such a manner that the content of ceramic particles was set to 9.0% by volume, the content of water set to 87.0% by volume, and the content of gelatin as a gelation agent was set to 4.0% by volume. In addition, the ceramic particles and pure water were put into an agitator and mixed with a ball mill for 12 hours at a rotation speed of 60 rpm to form a slurry. Then, gelatin was added to the slurry and mixed for 15 minutes to obtain a coating material.

Then, a filter base body was dipped in the coating material, and the filter base body was raised. Then, the filter base body was dried at 100° C. for 12 hours to form a coated film, which had microgrooves formed therein and which was formed from the ceramic particles, on a surface of the filter base body.

Next, the filter base body, on which the coated film of ceramic particle was formed, was put into an atmosphere furnace, an atmosphere in the furnace was set to an argon atmosphere, and a temperature inside the furnace was raised to 1700° C. at a rate of 15° C. per minute and was maintained for 2 hours to carry out sintering, whereby the exhaust gas purification filter of Example 2 was manufactured.

Example 3

90% by mass of silicon carbide particles having an average particle size of 0.5 μm and 10% by mass of the silicon carbide particles having an average particle size of 0.03 μm were weighed to adjust a mixture of silicon carbide particles.

Next, weighing was performed in such a manner that the content of ceramic particles was set to 16.0% by volume, the content of ethyl acetate was set to 80.0% by volume, and the content of a polyacrylic resin was set to 4.0% by volume. In addition, the ceramic particles and ethyl acetate were put into an agitator and mixed with a ball mill for 12 hours at a rotation speed of 60 rpm to form a slurry. Then, a melamine curing agent was added to the slurry and mixed for 5 minutes to obtain a coating material.

Then, a filter base body was dipped in the coating material, and the filter base body was raised. Then, the filter base body was dried at 100° C. for 4 hours to form a coated film, which was formed from the ceramic particles, on a surface of the filter base body.

Next, the filter base body, on which the coated film of ceramic particle was formed, was put into an atmosphere furnace, an atmosphere in the furnace was set to a nitrogen atmosphere, and the filter base body was maintained at 650° C. for 5 hours to remove the binder component. Then, the filter base body was maintained in an argon atmosphere at 1700° C. for 2 hours to carry out sintering, whereby an exhaust gas purification filter of Example 3 was manufactured.

Example 4

80% by mass of silicon carbide particles having an average particle size of 2.5 μm and 20% by mass of the silicon carbide particles having an average particle size of 0.03 μm were weighed to adjust a mixture of silicon carbide particles.

Next, weighing was performed in such a manner that the content of ceramic particles was set to 20.0% by volume, the content of water set to 76.0% by volume, and the content of gelatin as a gelation agent was set to 4.0% by volume. In addition, the ceramic particles and pure water were put into an agitator and mixed with a ball mill for 12 hours at a rotation speed of 60 rpm to form a slurry. Then, gelatin was added to the slurry and mixed for 15 minutes to obtain a coating material.

Then, a filter base body was dipped in the coating material, and the filter base body was raised. Then, the filter base body was dried at 100° C. for 12 hours to form a coated film, which had microgrooves formed therein and which was formed from the ceramic particles, on a surface of the filter base body.

Next, the filter base body, on which the coated film of ceramic particle was formed, was put into an atmosphere furnace, an atmosphere in the furnace was set to an argon atmosphere, and a temperature inside the furnace was raised to 1700° C. at a rate of 15° C. per minute and was maintained for 4 hours to carry out sintering, whereby an exhaust gas purification filter of Example 4 was manufactured.

Example 5

10% by mass of silicon carbide particles having an average particle size of 0.5 μm and 90% by mass of the silicon carbide particles having an average particle size of 0.02 μm were weighed to adjust a mixture of silicon carbide particles.

Next, weighing was performed in such a manner that the content of ceramic particles was set to 20.0% by volume, and the content of water set to 80.0% by volume. In addition, the ceramic particles and water were put into an agitator and mixed with a ball mill for 12 hours at a rotation speed of 60 rpm to form a slurry, whereby a coating material having a high coefficient of thixotropy was obtained.

Then, a filter base body was dipped in the coating material, and the filter base body was raised. Then, the filter base body was dried at 100° C. for 4 hours to form a coated film, which had microgrooves formed therein and which was formed from the ceramic particles, on a surface of the filter base body.

Next, the filter base body, on which the coated film of ceramic particle was formed, was put into an atmosphere furnace, and the atmosphere in the furnace was maintained in an argon atmosphere at 1700° C. for 2 hours to carry out sintering, whereby an exhaust gas purification filter of Example 5 was manufactured.

Comparative Example 1

90% by mass of silicon carbide particles having an average particle size of 0.8 μm and 10% by mass of the silicon carbide particles having an average particle size of 0.03 μm were weighed to adjust a mixture of silicon carbide particles.

Next, weighing was performed in such a manner that the content of ceramic particles was set to 7.0% by volume, the content of water set to 92.0% by volume, and the content of polyvinyl pyrrolidone (K-30, manufactured by Nippon Shokubai Co., Ltd.) as a binding agent was set to 1.0% by volume. In addition, the ceramic particles and pure water were put into an agitator and mixed with a ball mill for 12 hours at a rotation speed of 60 rpm to form a slurry. Then, gelatin was added to the slurry and mixed for 15 minutes to obtain a coating material.

Then, a filter base body was dipped in the coating material, and the filter base body was raised. Then, the filter base body was dried at 100° C. for 12 hours to form a coated film, which was formed from the ceramic particles, on a surface of the filter base body.

Next, the filter base body, on which the ceramic particles were applied, was put into an atmosphere furnace, an atmosphere in the furnace was set to an argon atmosphere, and a temperature inside the furnace was raised to 1700° C. at a rate of 15° C. per minute and was maintained for 2 hours to carry out sintering, whereby an exhaust gas purification filter of Comparative Example 1 was manufactured.

In regard to the above-described examples and comparative example, evaluation was performed with respect to the exhaust gas purification filter, and results shown in Table 1 were obtained.

In addition, a combustion temperature in Table represents a combustion temperature in a combustion test.

TABLE 1

|  | Thickness of porous film (μm) | Average pore size (μm) | Average porosity (% by volume) | Pressure loss (kPa) | Combustion test (min) | Combustion temperature (° C.) |
|---|---|---|---|---|---|---|
| Example 1 | 20 | 0.6 | 60 | 1.5 | 4 | 580 |
| Example 2 | 30 | 0.2 | 80 | 2.6 | 3 | 553 |
| Example 3 | 50 | 0.6 | 60 | 3.4 | 4 | 580 |
| Example 4 | 80 | 1.8 | 52 | 1.1 | 5 | 584 |
| Example 5 | 50 | 0.18 | 85 | 3.6 | 3 | 553 |
| Comparative Example 1 | 15 | 0.52 | 50 | 2 | 15 | 608 |

In addition, according to results of electron microscopic observation, in all of the exhaust gas purification filters in Examples 1 to 5, it was confirmed that microgrooves having a width of 1 μm or more were formed on the surface of the porous film, the microgrooves did not penetrate through the porous film, a depth of the microgrooves was within a range of 0.5 μm to 15 μm, and a presence ratio of the microgrooves was 5% to 10% or more.

Conversely, in the exhaust gas purification filter of Comparative Example 1, the microgrooves were not present and a flat film was observed.

Figure 5:
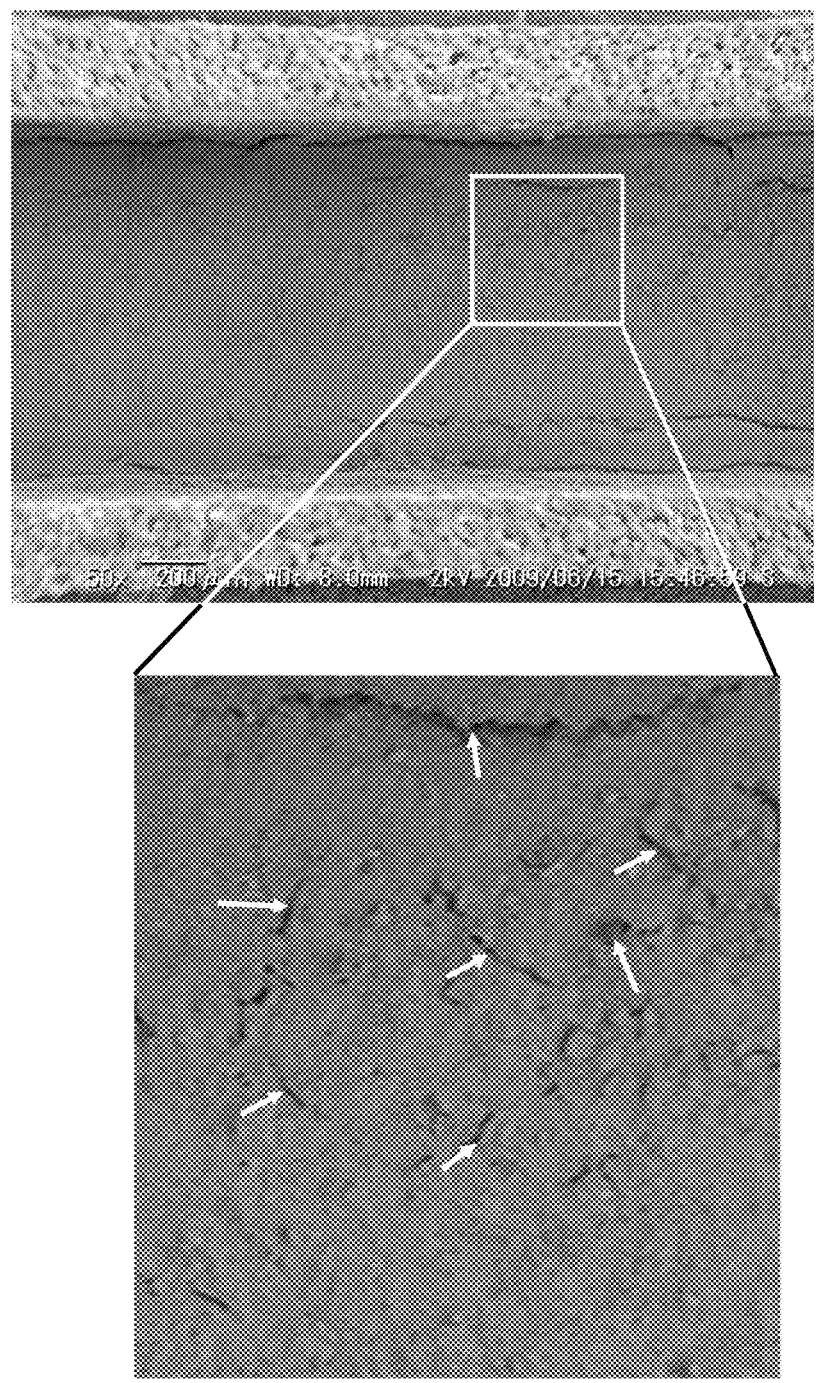
FIG. 5 is an electron microscope photograph illustrating a result of an example.
Figure 6:
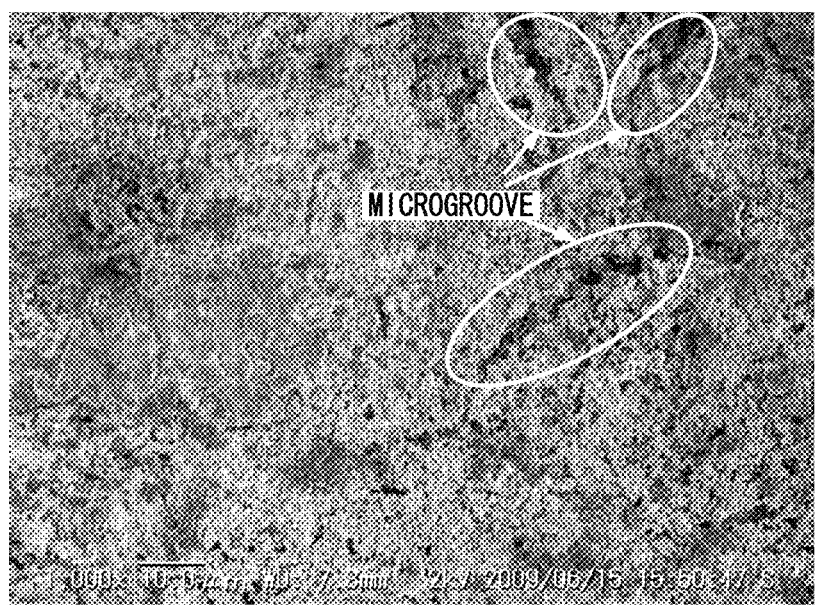
FIG. 6 is an electron microscope photograph illustrating a result of the example.

FIGS. 5 and 6 show electron microscope photographs with respect to the exhaust gas purification filter of Example 1, in which FIG. 5 shows a photograph illustrating an inner wall of an inflow cell, and FIG. 6 shows an enlarged photograph of an inner wall of an inflow cell.

As shown in FIG. 5, in the exhaust gas purification filter of Example 1, a plurality of microgrooves are formed not only at corner portions of the inflow cell but also at a planar portion. In the drawing, examples of the microgrooves are indicated by arrows, but it is clear from the photograph that a plurality of microgrooves that are not indicated by arrows are present.

In addition, as shown in FIG. 6, it can be seen that a plurality of microgrooves, which is not recognized with a magnification of the photograph of FIG. 5, is also formed.

Figure 7:
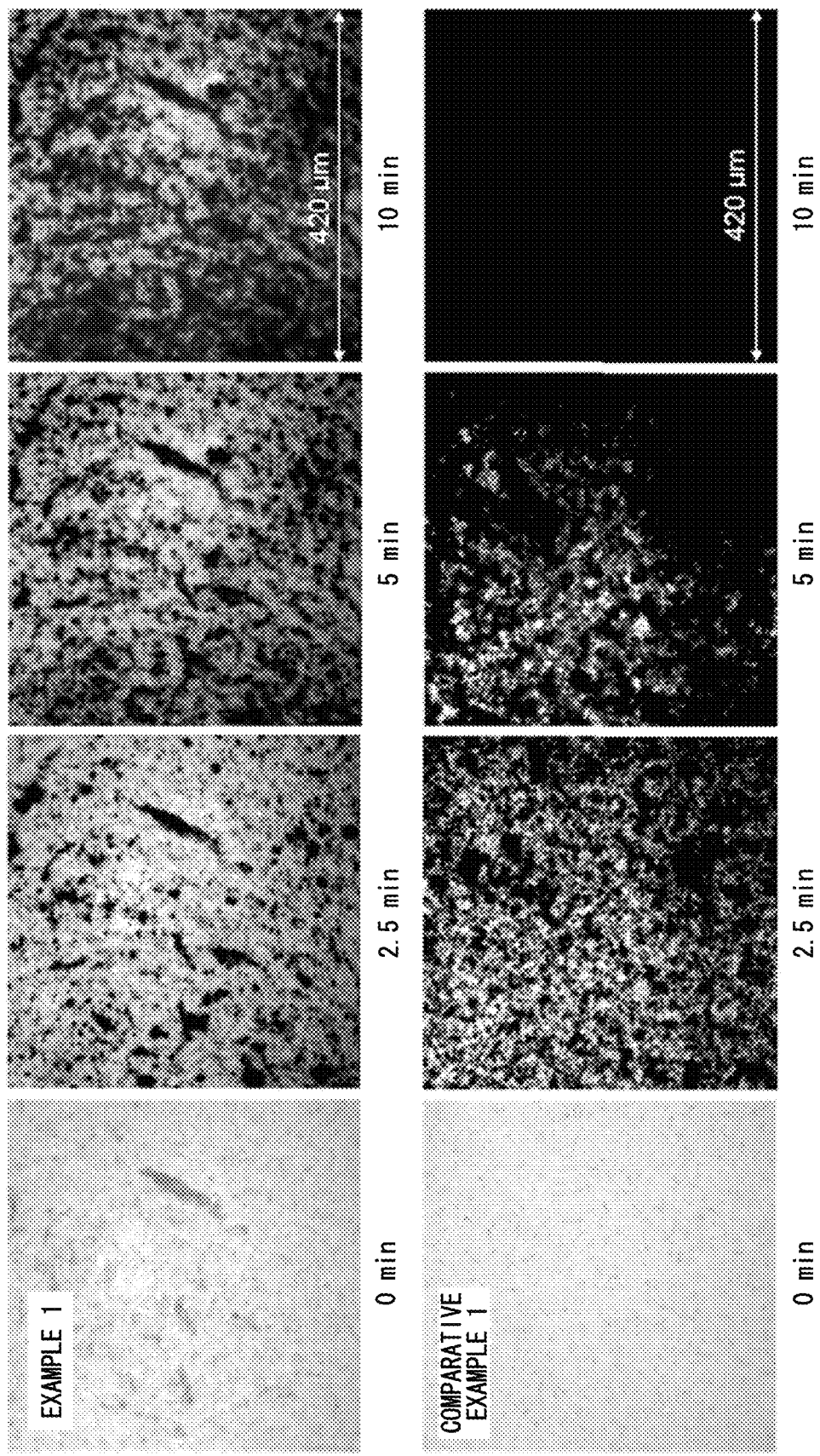
FIG. 7 is a microscope photograph illustrating a result of the example.

Furthermore, according to the observation result of the exhaust gas purification filter, in all of the exhaust gas purification filters of Examples 1 and 2, and Comparative Example 1, trapping efficiency is the same in each case. FIG. 7 shows a microscope photograph of the exhaust gas purification filter. In FIG. 7, a filter surface is colored in black accompanying the trapping of the particulate matter, and thus a position at which the particulate matter is trapped can be seen.

As shown in FIG. 7, in the exhaust gas purification filter of Example 1, at the early stage of trapping, the microgrooves are selectively colored in black, and thus it can be seen that exhaust gas passes through the exhaust gas purification filter through portions of the microgrooves, and the particulate matter is selectively trapped in the microgrooves. In addition, when a trapping time has passed, microgrooves that are not recognized at the beginning of the trapping are present, and on the other hand, since the entirety of the filter is gradually colored in black, it can be seen that at a latter period of the trapping, the particulate matter is trapped at the entirety of the filter. Furthermore, it can be seen that even in the latter period of trapping, it is not entirely colored in black in a uniform manner, and a portion that still looks white, that is, a portion at which the particulate matter is not deposited largely, is present. At this portion, it is considered that the exhaust gas easily passes through and a filter function is not damaged compared to a portion at which a large amount of particulate matter is deposited (colored in black).

Conversely, in the exhaust gas purification filter of Comparative Example 1, it can be seen that the entirety thereof is colored in black from the early stage of the trapping and there is no difference in trapping efficiency of the particulate matter in terms of the entirety of the filter.

In addition, according to the observation results of the exhaust gas purification filter, it takes longer for a regeneration treatment in Comparative Example 1 than Examples 1 to 5.

For example, as shown in FIG. 8, in the exhaust gas purification filter of Example 1, the regeneration treatment was terminated after performing a treatment at 580° C. for 4 minutes, and in the exhaust gas purification filter of Example 2, the regeneration treatment was terminated after performing a treatment at 553° C. for 3 minutes.

Conversely, in the exhaust gas purification filter of Comparative Example 1, the particulate matter still remains even after performing the treatment at 608° C. for 15 minutes. In the exhaust gas purification filter of Comparative Example 1, a regeneration treatment time of approximately four times that of the exhaust gas purification filter of Examples 1 and 2 was needed.

From the above-described results, it was confirmed that in the exhaust gas purification filter of the examples, high trapping efficiency of particulate matter and low pressure loss were achieved, and thus usability of the invention was confirmed.

INDUSTRIAL APPLICABILITY

The exhaust gas purification filter of the invention can achieve high trapping efficiency of PM and low pressure loss. Specifically, the exhaust gas purification filter of the invention has superior characteristics without discharging PM, which becomes a cause of atmospheric pollution, to ambient air and without applying a load to an engine due to low pressure loss and thereby not deteriorating fuel efficiency.

In addition, according to the method of manufacturing an exhaust gas purification filter of the invention, an exhaust gas purification filter having the above-described superior characteristics can be easily manufactured.

REFERENCE SIGNS LIST

10: Exhaust gas purification filter
11: Filter base body
12: Gas flow path
12A: Inflow cell
12B: Outflow cell
13: Porous film
14: Partition wall
15: Microgroove
30: Particulate matter
α, γ: Cross-section
G: Exhaust gas
C: Purified gas

The invention claimed is:

1. An exhaust gas purification filter, including:
an inflow surface through which exhaust gas containing particulate matter flows in;
a discharge surface from which purified gas is discharged; and
a filter base body that is formed from a porous body,
wherein the filter base body includes porous partition walls and gas flow paths surrounded by the partition walls, a porous film having a pore size smaller than a size of pores of the partition walls is provided on each surface of the partition walls, and
microgrooves have a depth in a range of 10% to 50% of the film thickness of the porous film at a portion in which the microgrooves are formed.

2. The exhaust gas purification filter according to claim 1, wherein when a projection area of the porous film in a film surface direction is set as F, and a projection area of the microgrooves in the same direction is set as G, a presence ratio of the microgrooves in the surface of the porous film satisfies $0.05 \leq G/F \leq 1$.

3. The exhaust gas purification filter according to claim 1, wherein in each of the microgrooves, the width is 1 μm or more, and the depth is 0.5 μm to 15 μm.

4. The exhaust gas purification filter according to claim 1, wherein the thickness of the porous film is 5 to 80 μm.

5. The exhaust gas purification filter according to claim 1, wherein the pore size of the porous film is smaller than a pore size of the filter base body, and a pore size of the porous film on a surface side is smaller than a pore size of the porous film on a filter base body side.

6. The exhaust gas purification filter according to claim 1, wherein a material of the porous film includes a silicon carbide as a main component.

7. A method of manufacturing an exhaust gas purification filter according to claim 1, the method including:
a step of preparing a coating material containing at least a particle component for forming a porous film and a dispersion medium and
a step of applying the coating material on a surface of a filter base body to form an applied film;
a step of removing a part of the dispersion medium in the applied film to form a coated film in which fluidity is lost; and
a step of further removing the dispersion medium in the coated film in which fluidity is lost to form microgrooves having a depth in a range of 10% to 50% of the film thickness of the porous film at a portion in which the microgrooves are formed in a surface of the coated film.

8. A method of manufacturing an exhaust gas purification filter according to claim 1, the method including:
a step of preparing a coating material containing at least a particle component for forming a porous film, a dispersion medium, and a binder component;
a step of applying the coating material on a surface of a filter base body to form an applied film containing the binder component;
a step of removing the dispersion medium in the applied film containing the binder component to form a cured coated film; and
a step of removing the binder component in the cured coated film to form microgrooves having a depth in a range of 10% to 50% of the film thickness of the porous film at a portion in which the microgrooves are formed in a surface of the coated film.

9. The method of manufacturing an exhaust gas purification filter according to claim 7,
wherein the particle component includes first particles containing particles having a primary particle size of 10 to 120 nm in 90% by volume or more, and second particles containing particles having a primary particle size of 300 to 1,000 nm in 90% by volume or more, and
a volume ratio between the first particles and the second particles is within a range of 3:97 to 97:3.

10. The method of manufacturing an exhaust gas purification filter according to claim 8,
wherein the particle component includes first particles containing particles having a primary particle size of 10 to 120 nm in 90% by volume or more, and second particles containing particles having a primary particle size of 300 to 1,000 nm in 90% by volume or more, and
a volume ratio between the first particles and the second particles is within a range of 3:97 to 97:3.

* * * * *